United States Patent [19]

Chotiros

[11] Patent Number: 4,891,762

[45] Date of Patent: Jan. 2, 1990

[54] METHOD AND APPARATUS FOR TRACKING, MAPPING AND RECOGNITION OF SPATIAL PATTERNS

[76] Inventor: Nicholas P. Chotiros, 1508 Charolais Dr., Austin, Tex. 78758

[21] Appl. No.: 154,048

[22] Filed: Feb. 9, 1988

[51] Int. Cl.[4] .................. G06F 15/50; G06F 15/70
[52] U.S. Cl. .................... 364/456; 342/64; 382/16
[58] Field of Search ........... 364/449, 456, 423, 458, 364/454, 443; 342/64, 90, 180; 382/16, 22, 26, 30, 48

[56] References Cited

U.S. PATENT DOCUMENTS

| | | | |
|---|---|---|---|
| 3,879,728 | 4/1975 | Wolff | 342/64 |
| 3,992,707 | 11/1976 | Schmidtlein et al. | 342/64 |
| 4,164,728 | 8/1979 | Marsh | 342/64 |
| 4,179,693 | 12/1979 | Evans et al. | 342/64 |
| 4,192,004 | 3/1980 | Buerger | 364/518 |
| 4,396,903 | 8/1983 | Habicht et al. | 342/64 |
| 4,490,719 | 12/1984 | Botwin et al. | 342/64 |
| 4,494,200 | 1/1985 | Lam | 364/449 |
| 4,514,733 | 4/1985 | Schmidtlein et al. | 342/64 |
| 4,590,608 | 5/1986 | Chen et al. | 382/43 |
| 4,602,336 | 7/1986 | Brown | 364/456 |
| 4,635,203 | 1/1987 | Merchant | 364/458 |
| 4,700,307 | 10/1987 | Mons et al. | 364/453 |
| 4,715,005 | 12/1987 | Heartz | 364/521 |
| 4,736,436 | 4/1988 | Yasukawa et al. | 382/16 |
| 4,754,493 | 6/1988 | Coates | 382/48 |

OTHER PUBLICATIONS

Besl, "Geometric Modeling and Computer Vision," pp. 936–958, Proceedings of the IEEE, vol. 76, No. 8, Aug., 1988.
Eppig, "Autonomous Vehicles for Underwater Search and Survey," pp. 46–60, Presented at the 4th International Symposium on Unmanned Untethered Submersible Technology, Jun. 24–27, 1985.

Primary Examiner—Parshotam S. Lall
Assistant Examiner—Thomas G. Black

[57] ABSTRACT

A method and apparatus for the identification of spatial patterns that occur in two or more scenes or maps. Each pattern comprises a set of points in a spatial coordinate system collectively represented by the geometrical figure formed by connecting all point pairs by straight lines. The pattern recognition process is one of recognizing congruent geometrical figures. Two geometrical figures are congruent if all the lines in one geometrical figure are of the same length as the corresponding lines in the other. This concept is valid in a spatial coordinate system of any number of dimensions. In two- or three-dimensional space, a geometrical figure may be considered as a polygon or polyhedron, respectively. Using the coordinates of the points in a pair of congruent geometrical figures, one in a scene and the other in a map, a least squares error transformation matrix may be found to map points in the scene into the map. Using the transformation matrix, the map may be updated and extended with points from the scene. If the scene is produced by the sensor system of a vehicle moving through an environment containing features at rest, the position and orientation of the vehicle may be charted, and, over a series of scenes, the course of the vehicle may be tracked. If the scenes are produced by a sensor system at rest, then moving objects and patterns in the field of view may be tracked.

5 Claims, 7 Drawing Sheets

METHOD AND APPARATUS FOR TRACKING, MAPPING AND RECOGNITION OF SPATIAL PATTERNS

I. BACKGROUND—FIELD OF INVENTION

The invention concerns methods and apparatus for the recognition, tracking and mapping of spatial patterns for a variety of uses.

II. BACKGROUND—DESCRIPTION OF PRIOR ART

The background may be divided into three connected parts: method, apparatus and applications:

A. Method

The fundamental process is one of recognition of unique spatial patterns that recur in two or more scenes. A comprehensive reference of the existing methods is given by Paul J. Besl in his article, "Geometric Modeling and Computer Vision," Proceedings of the IEEE, pages 936 to 958, Volume 76, Number 8, August 1988. The methods may be divided into two main categories: linear and nonlinear. The method of the invention falls in the latter category.

A.1 Linear methods:

The linear methods are based on the crosscorrelation process, which is inherently linear. It has a number of drawbacks, however. One drawback is that it requires a large amount of computation power. Attempts to improve the computational efficiency include hierarchical correlation processing and hierarchical organization of the scene. Another drawback is its inefficiency in dealing with patterns of unknown rotation. To remedy this problem, there have been several attempts, in both space and wave number domains, to develop rotation invariant methods. In all cases, the computational efficiency could only be increased at the expense of reduced scene resolution and a degradation in the recognition performance. In applications where there is a large amount of redundancy in the pattern, such as in the recognition of printed text, this is not a serious drawback. A third drawback is the tendency of the crosscorrelation process to give ambiguous or false results when the scene is noisy, imperfect or incomplete.

A.2 Nonlinear methods

The nonlinear methods are a loose collection of heuristic methods based on feature extraction and pattern matching concepts, in which the position and orientation of a set of features in a spatial coordinate system is termed a pattern. In a two-dimensional scene, features may include discrete points, texture, gray scale, lines, curves and corners, and planar surfaces. In a two-dimensional space, the pattern formed by a set of points may be represented by a polygon, and in a three-dimensional space, a polyhedron. Feature extraction and pattern matching have been successfully applied to certain types of optical and radar images, and in the recognition of printed and handwritten text.

The method of the invention is one of recognizing patterns that may be considered as geometrical figures, including polygons and polyhedrons. In practice, the computation resources and computation time required by the existing methods of recognizing polygons and polyhedrons increase sharply with scene complexity, therefore they are most useful when applied to simple scenes or selected parts of complicated scenes. This is quite acceptable for scenes which contain simple patterns or complicated patterns with much redundancy, but not for cluttered scenes that may contain incomplete patterns with little redundancy. In this respect, the method of the invention is superior to existing methods.

B. Apparatus

The invention is expected to be particularly useful in practical applications of pattern recognition, where the available space and electrical power are limited. These limitations impose definite constraints on the design of the apparatus. For example, in an autonomous underwater vehicle, it is estimated that a few tens of watts of electrical power may be available for navigation and guidance computations. Using CMOS technology, it is possible to achieve processing rates of more than 10 million integer multiply-and-accumulate operations per second (Mmacs) for a power consumption of only one watt. Therefore, an acceptable navigation processor should not require more than a few hundred Mmacs of processing power. These constraints effectively exclude a large proportion of the above mentioned methods from applications in autonomous underwater vehicles.

C. Applications

The invention is expected to be particularly useful to applications in autonomous navigation. There are a number of autonomous navigation system in existence. They include ballistic missile and cruise missle guidance systems. Equivalent systems for autonomous underwater or land vehicles, that can guide an unmanned craft to its destination over long distances, are still in their infancy. The navigation methods and equipment of existing unmanned autonomous underwater vehicles, described by Stephen H Eppig in a paper entitled, "Autonomous vehicles for underwater search and survey," presented at the 4th International Symposium on Unmanned Untethered Submersible Technology June 24–27 1985, are based on a combination of inertial navigation system aided by Doppler or correlation sonars with periodic course corrections provided by acoustic ranging. Acoustic ranging systems rely on a network of acoustic transponders that must be deployed at strategic positions within the operating area, therefore they cannot be considered as selfcontained systems. The Doppler or correlation sonars provide a measurement of cruising velocity that may be integrated to give an estimate of the distance traveled. In conjunction with an inertial navigation system, the velocity measurements may be used to estimate course and position relative to a set of known starting coordinates.

Systems based on the Doppler or correlation sonars are the only selfcontained underwater navigation systems currently available, i.e. systems that do not require external equipment such as beacons or transponders. Both types of sonars are inclined to give velocity measurement errors, particularly over sloping ocean bottoms or moving scattering layers. The resulting error in the position estimation is cumulative, therefore, corrective position fixes by other means are necessary at periodic intervals. Systems based on velocity measurement and integration are also incapable of recognizing previously traversed areas. Apart from this invention, there are no selfcontained systems that can successfully navigate by the tracking and recognition of naturally occurring features on the ocean bottom; contributing factors include the relative scarcity of information in sonar images and the substantial computation resources required by existing methods. The method of the invention is successful because it is particularly efficient in its use of information and computation resources.

III. OBJECTS AND ADVANTAGES

Accordingly I claim the following as objects and advantages of this invention: to provide a method and apparatus for the recognition, tracking and mapping of spatial patterns, using a pattern recognition process whose distinguishing features are (a) the concept of congruent geometrical figures and (b) a maximum likelihood method of efficiency enhancement.

In addition, I claim the following objects and advantages: to provide a method and apparatus that facilitates the navigation of manned or unmanned vehicles through the recognition, tracking and mapping of spatial patterns formed by environmental features, to provide a method and apparatus to produce and store feature maps, to provide a method and apparatus to recognize previously encountered areas and to track vehicle position and orientation with the aid of feature maps.

Further objects and advantages of the invention may be found from the ensuing description and accompanying drawings.

IV. DRAWINGS AND FIGURES

Figure 1:
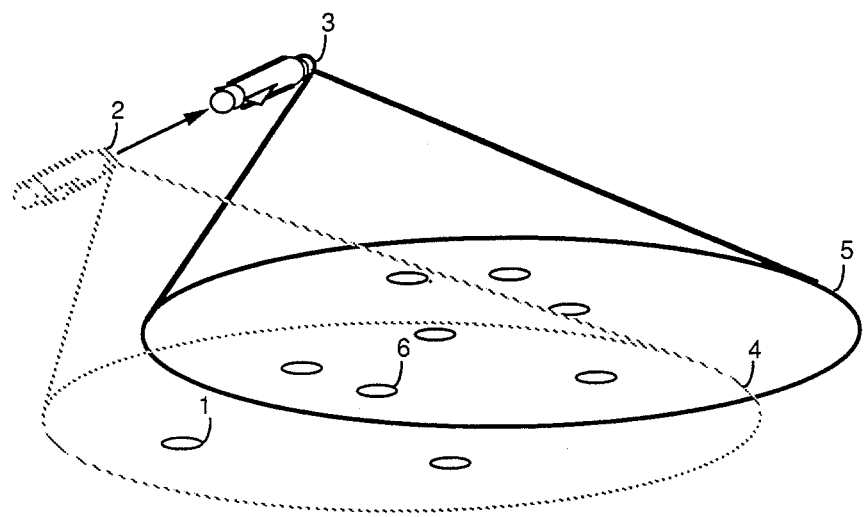
FIG. 1 illustrates the application of pattern recognition to navigation.

V. DRAWING REFERENCE NUMERALS 1 discrete features
2 previous position
3 current position
4 field of view at the previous position
5 field of view at the current position
6 discrete features that are common to both fields of view
7 feature map
8 current scene
9 vehicle position on feature map
10 starting point
11 destination
12 navigation processor
13 mission objectives
14 sensor system for detecting and locating environmental features
15 position and orientation tracking processor
16 steering and speed correction processor
17 steering and speed controller
18 clustering processor
19 compacted scene
20 spatial pattern recognition processor
21 list of matched lines compilation processor
22 list of matched lines
23 list of matched lines reduction processor
24 reduced list of matched lines
25 congruent geometrical figures recognition processor
26 congruent geometrical figures
27 coordinate transformation matrix computation processor
28 map updating processor
29 vehicle velocity, position and orientation computation processor
30 common matched lines tallying processor
31 tally matrix
32 list of likely matched points compilation processor
33 list of likely matched points
34 list of likely matched lines compilation processor
35 list of likely matched lines
36 matched lines elimination processor

VI. DESCRIPTION

In the following, the invention in and its application in the navigation of a vehicle is described. The navigation application is described because it well illustrates the operation of the invention. The description is given in two levels: concept and process. At the concept level, a qualitative description is given of the invention and its uses as a navigation tool. At the process level, the operation of the invention within a navigation system is described in detail.

A. Concept

Consider a vehicle, traveling through an environment in which there are a number of features, and equipped with a sensor system that is able to detect the features and to estimate the position of each feature relative to the vehicle. Practical examples include: a space craft equipped with an optical imaging and ranging system traveling through a planetary system, an aircraft equipped with radar traveling over a terrestrial area, and an underwater vehicle equipped with sonar traveling over the ocean bottom. In the first example, the relevant features may be celestial objects, in the second example, telephone poles, trees and other landmarks that are detectable by a radar system, and in the third example, rocks, clumps of coral and other features of the ocean bottom that are detectable by a sonar system.

In FIG. 1, a vehicle is shown traveling over an area containing discrete features 1 that are detectable to its sensor system. The illustration shows the vehicle at a previous position 2 and its current position 3. At the previous position 2, the vehicle has a certain field of view 4, in which it detects a number of the features. Let the field of view 5 at the current position overlap the field of view 4 at the previous position. For each field of view, the sensor system provides a set of information, called a scene, comprising the signal intensities produced by the detected features and their estimated positions relative to the vehicle. The position of each feature is represented by a single point in a spatial coordinate system. A number of features 6 lie within the intersection of the two fields of view, consequently they must be represented in the two corresponding scenes. An apparatus, that can recognize and match the points representing the common features 6 in the two scenes, will enable the vehicle to track its movement from the previous position 2 to the current position 3.

Using the positional information provided by the sensor system, straight lines may be used to connect any set of points within a scene to form a geometrical figure. The geometrical figure is uniquely defined by the lights of the lines joining all point pairs within the set. This concept is valid in a spatial coordinate system of any number of dimensions. In a two- or three-dimensional space, the geometrical figure may be considered as a polygon or polyhedron, respectively. By this concept, the common features 6 may be described as a geometrical figure. If all the lines in one geometrical figure are of the same length as the corresponding lines in another geometrical figure, then the two are said to be congruent. It follows from the above definition of the geometrical figure that identical geometrical figures must be congruent. Therefore, the process of recognizing common features in two fields of view may be formulated as one of recognizing congruent geometrical figures between the two corresponding scenes.

Figure 2:
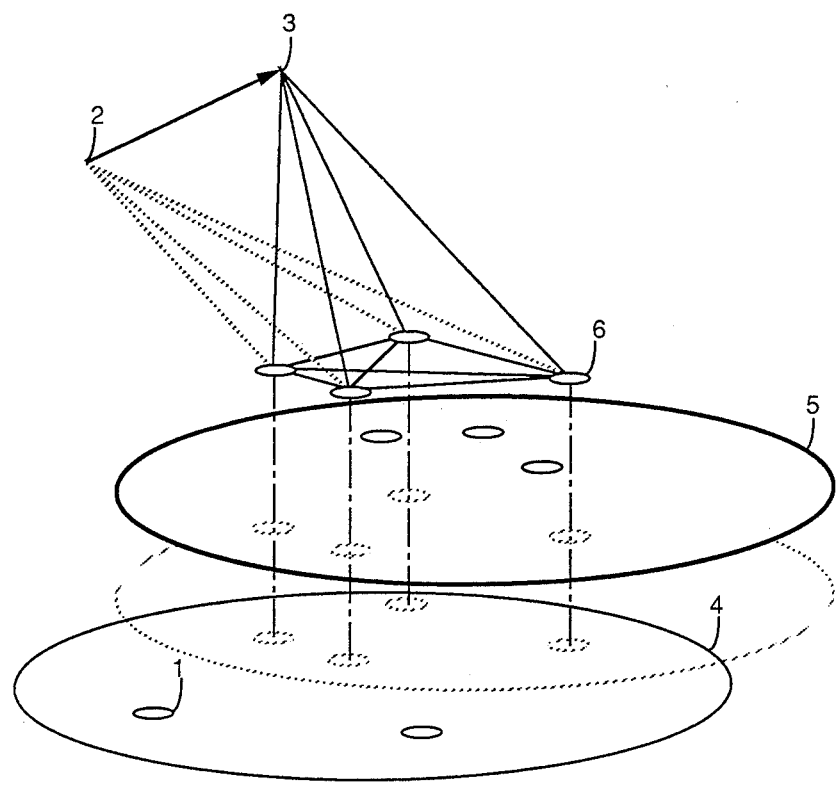
FIG. 2 illustrates the pattern recognition concept.

The geometrical figure formed by the common features 6, and the positions of the vehicle relative to it, are illustrated in FIG. 2. The vehicle positions 2 and 3, relative to the geometrical figure, are constructed from the positional information contained in the two scenes. The change in position of the vehicle from 2 to 3 is equal to the difference between the two position vectors.

In general, a map may be defined as a collection of points in space whose positions relative to accepted geographical references are known, or considered to be known. If the previous position and orientation of the vehicle 2 is known or considered to be known, then the corresponding scene may be converted into a map. Through the recognition congruent geometrical figures, the current vehicle position may be charted on the map.

Figure 3:
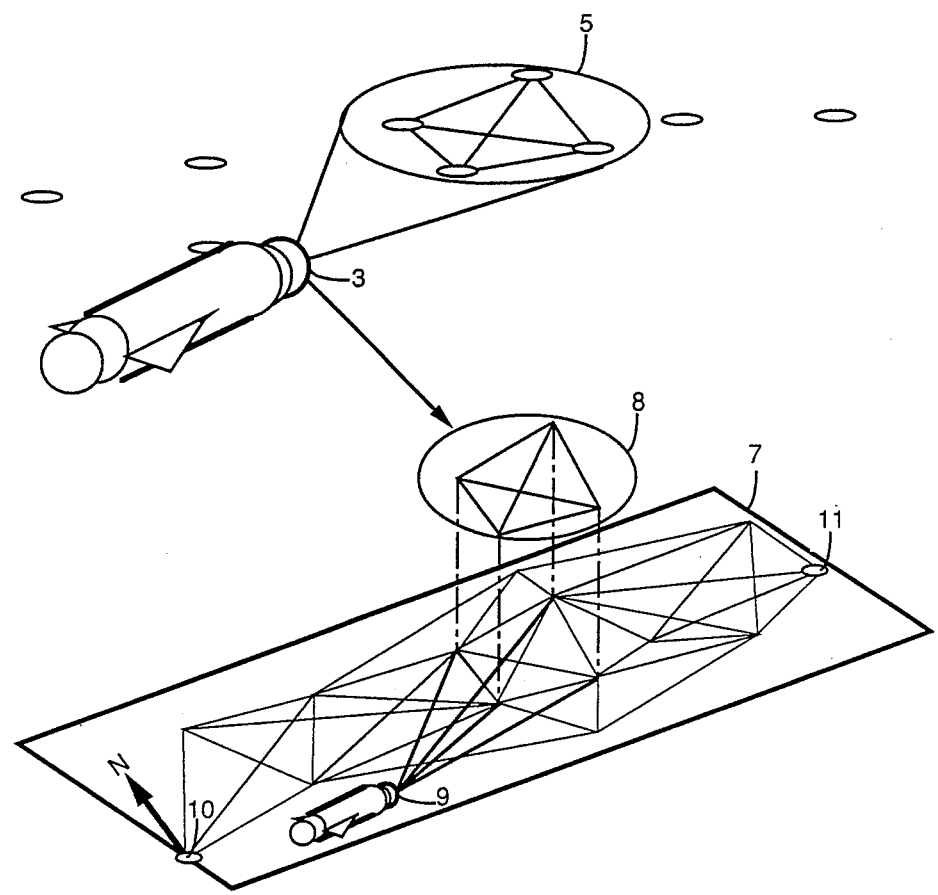
FIG. 3 illustrates the process of navigating a course using an existing feature map.

With reference to FIG. 3, if a map 7 of an operating area were available, then congruent geometrical figures between a current scene 8 and the map may be used to chart the position of the vehicle 9 in the map. In this way, the course and position of the vehicle may be continuously tracked. This concept may be used to guide a vehicle from a starting position 10 to its destination 11, as illustrated in FIG. 3.

Figure 4:
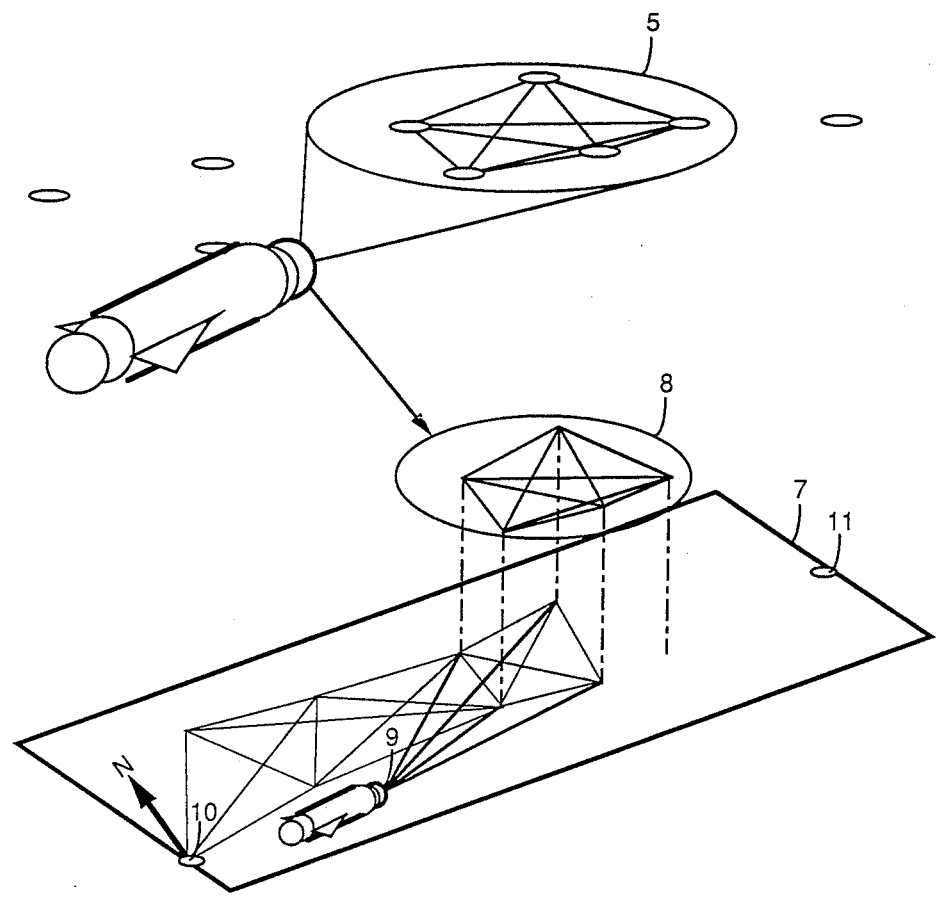
FIG. 4 illustrates the process of navigating a course and the accumulation of a feature map.

In the absence of a map, a vehicle may guide itself towards a designated destination 11, defined in terms of a distance and bearing from a known starting orientation and position 10, through the following steps: Using the known starting position and orientation, the contents of a scene acquired at the starting position and orientation may be converted into a map. Then, through a series of overlapping scenes linked by congruent geometrical figures, the map may be extended in the direction of the destination by the accumulation of interlocking geometrical figures, as illustrated in FIG. 4. The process may be continued until the requisite distance is covered.

B. Process

Figure 5:
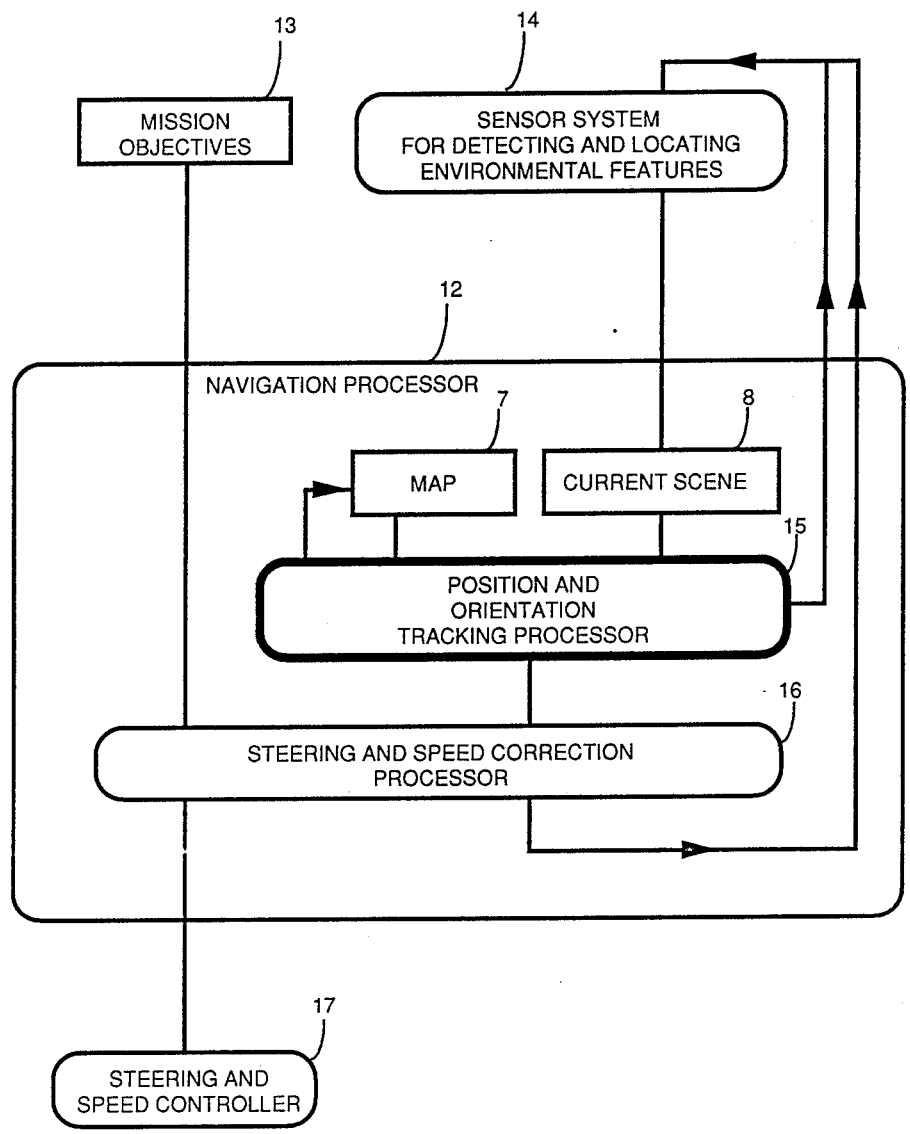
FIG. 5 shows the flowchart of a navigation system.

A description of the invention and its application to vehicle navigation will be given, with particular emphasis on underwater vehicles. A simplified flowchart of a navigation system is shown in FIG. 5. The navigation processor 12 is driven by the mission objectives 13. A sensor system 14 is used to provide the navigation processor with scenes that represent features in the environment. The navigation processor may be subdivided into two component processors, a position and orientation tracking processor 15, and a steering an speed correction processor 16; both may request the sensor system to provide a new current scene 8 as necessary. The steering an speed correction processor drives a steering and speed controller 17 which operates the steering and propulsion units, thus closing the control loop.

In this application, the invention is the position and orientation tracking processor 15. The components of the navigation system are described in the following sections. In particular, the operation of the invention, that is the position and orientation tracking processor, is described in section B.2 and its subsections B.2 a through B.2.d.

B.1 The sensor system

A suitable sensor system is used to produce a scene, by detecting the presence of discrete features within the field of view and to estimate their positions relative to the vehicle. Many types of sensor systems are capable of producing scenes of this type, such as radar, lidar, and stereoscopic passive sensor systems. For an underwater vehicle, the sensor system is usually a sonar system. A brief description of the operation of a suitable sonar system will be given for completeness.

The sonar system detects features on the ocean bottom through the ability of the features to scatter sound. Features are detected by collecting the backscattered sound signals produced by sound waves impinging on them. The sonar system includes beamformers that are used to separate the backscattered signals into beams according to their directions of arrival. A peak in the intensity of the signals in any beam is indicative of a feature in the corresponding direction; the travel time of the signal peak is measured and used to estimate the range of the indicated feature. Suitably prominent signal peaks are collected. For each peak, the position of the corresponding feature is calculated from the estimated range and direction of arrival. The result is a set of data points that constitute the current scene 8, each data point containing a signal intensity and an estimate of position relative to the sensor position.

By implication, the sensor position must be at the origin of the coordinate system of the point positions. For simplicity, a principal axis of the coordinate system is aligned with the sensor orientation. Since the sensor system is an integral part of the vehicle, the sensor position and orientation may be considered identical to the position and orientation of the vehicle.

B.2 Position and orientation tracking processor

Figure 6:
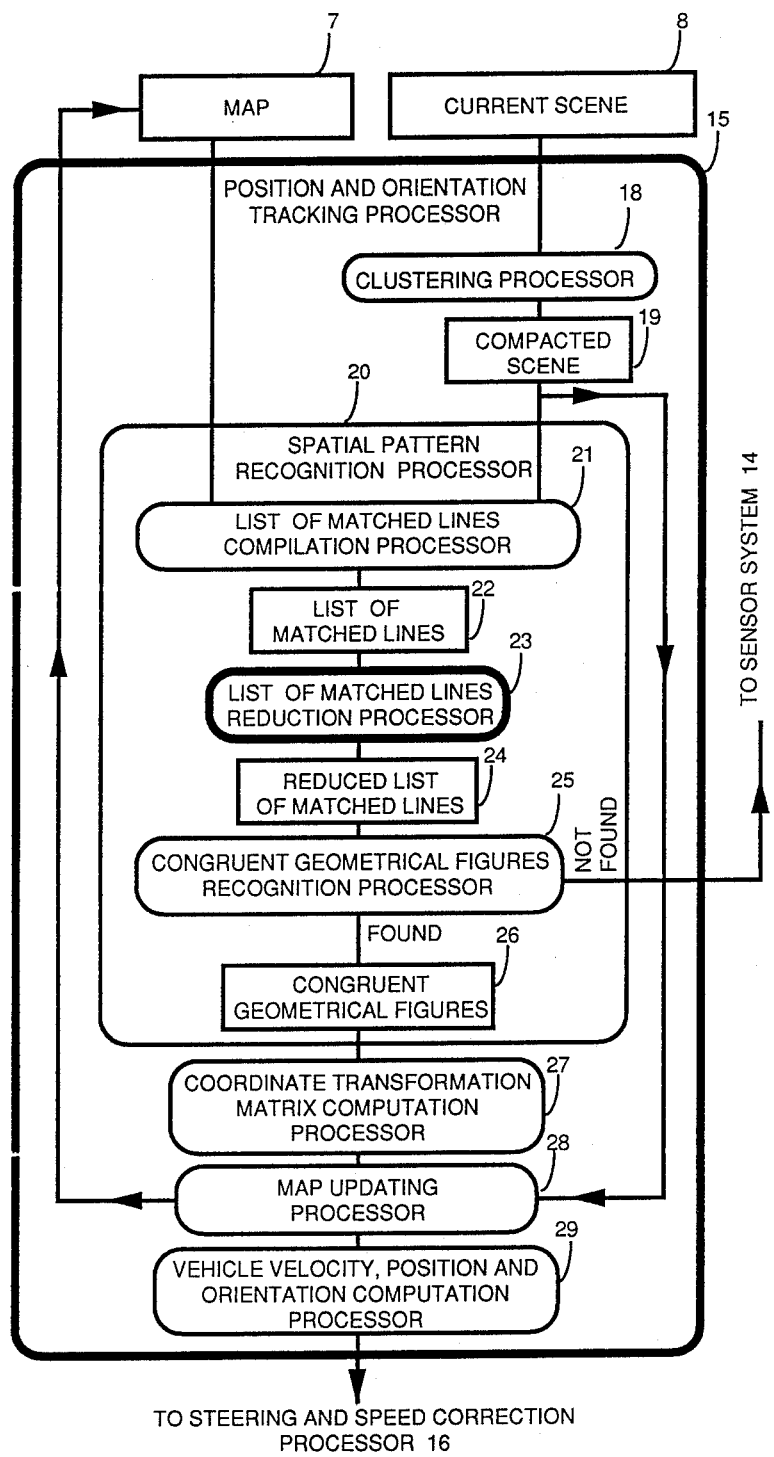
FIG. 6 shows the flowchart of the position and orientation tracking processor.

The position and orientation tracking processor is illustrated in FIG. 6. It is subdivided into a number of component processors described as follows.

B.2.a Clustering processor: In practice, the position of every point in a scene is subject to a degree of uncertainty. At any given level of confidence, the uncertainty may be expressed in terms of a confidence interval. Using simple decision theory methods, the confidence interval of the position of a point is calculated from the feature location accuracy of the sensor system and the selected confidence level. The feature location accuracy of the sensor system is determined by physical factors and the characteristics of the sensor system. The selected confidence level is a parameter with possible values between 0 and 100%; while there are no set rules regarding its proper value, intermediate values have been found to give satisfactory results.

In practice, more than one data point may be found within the span of a confidence interval. The presence of more than one data point within a confidence interval represents an unnecessary redundancy. Therefore, a clustering processor 18 is used to identify groups of two or more points that occupy a space too small to be reliably resolved by the sensor system at the selected confidence level, and replace each group by a single representative data point at the centroid of the group;

the centroid is defined as the average position weighted by signal intensity. Then, a unique identifier is assigned to each data point. An identifier may be a character string, bit pattern or any other suitable form of symbolic information. The result is a compacted scene 19.

B.2.b The spatial pattern recognition processor: The operation of the spatial pattern recognition processor 20 is based on the criterion:

Two geometrical figures are congruent if the straight lines connecting all corresponding point pairs are of equal length.

A straight line is defined as the shortest path between two points in a space of one or more dimensions, not necessarily limited to three dimensions.

Before going into the description of the processor itself, there are two important practical aspects that need to be considered, line length accuracy and recognition performance.

Just as there are uncertainties associated with the point positions, there must be uncertainties associated with the length of lines joining pairs of points. This uncertainty may also be allowed for in the form of a confidence interval. Thus, two line lengths are considered equal if the difference is within their combined confidence interval. The combined confidence interval may be approximated by the incoherent sum of the resolved confidence intervals of the positions of the four end points.

As a consequence of line length uncertainties and other imperfections, it must be concluded that, in practice, there is a finite probability that the performance of the recognition processor may be less than perfect. Following standard decision theory methodology, the performance may be expressed in terms of the probability of detection and the probability of false alarm; in this context, "detection" refers to the proper recognition of congruent geometrical figures, and "false alarm" refers to a false recognition. In order to achieve or exceed a prescribed level of performance, it can be shown that the number of points in the congruent geometrical figures must be equal to or exceed a minimum threshold number. The said threshold number may be calculated from the required probabilities of detection and false alarm, the confidence intervals of the point positions, the dimensions of the compacted scene and the relevant region of the map, and the average densities of the points in the compacted scene and in the map.

Using information available to the navigation system, such as estimated vehicle velocity and elapsed time, it is often possible to limit the search to a relevant region in the map containing all the points that may be expected to form a geometrical figure congruent with another in the compacted scene. Similar search limits may also be applicable within the compacted scene. These limits can help improve performance and reduce costs. By calculating all the combinations and permutations that have to be tested, and given the above practical considerations, it can be shown that, to achieve a useful level of performance, a direct search, of scenes and maps produced by sonars, would be prohibitively costly in terms of search time and computation resources. A significantly more efficient method, embodied in the spatial pattern recognition processor 20, is hereby disclosed.

The spatial pattern recognition processor 20 may be divided into three parts:

(1) A processor 21 is used for comparing the lengths of straight lines between point pairs in the compacted scene to those of a relevant set of point pairs in the map and compiling a list of all point pairs of equal line lengths at the required confidence level, known as the list of matched lines 22. The list is a symbolic list comprising a series of entries, each entry containing the identifiers of two points in the compacted scene and the identifiers of two points in the map that are joined by lines of equal length. The list is expected to be quite lengthy, therefore it should be well organized for efficient searching: The contents of each entry should be arranged in a definite order, with the identifiers from the compacted scene and those from the map paired and arranged in a definite order, and the identifiers within each pair ordered in a definite order, such as by alphabetical or numerical order. The entries should also be ordered in a definite order according to their contents, such as by alphabetical or numerical order.

Figure 7:
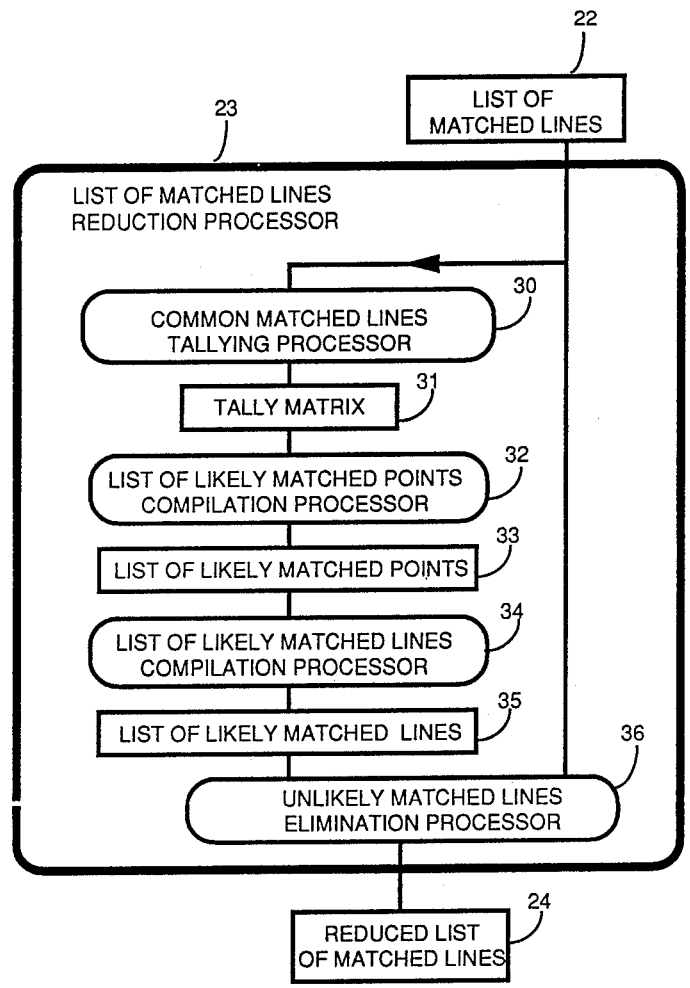
FIG. 7 shows the flowchart of the list of matched lines reduction processor.

(2) A list reduction processor 23 is used to reduce the list 22 by a maximum likelihood method. Its flowchart is shown separately in FIG. 7. The process involves the generation of a series of lists. For efficient searching, each list should be organized in a similar way to the list of matched lines. The processor 23 may be divided into four parts:

(a) A processor 30 for producing a tally matrix 31 of the number of matched lines that are common between each point in the compacted scene and another point in the map, by tallying the entries in the list 22 that contain each point pair. The resulting tally matrix 31 comprises a two-dimensional array, with the columns assigned to the points in the compacted scene, one point per column, and the rows assigned to the relevant set of points in the map, one point per row, and containing the number of matched lines common to all point pairs corresponding to the intersecting rows and columns.

(b) A processor 32 for compiling a list of pairs of likely matched points 33, by searching each row and each column of the tally matrix for the maximum tally, and taking the point pairs corresponding to the columns and rows that intersect at each maximum.

(c) A processor 34 for searching the list 33 to find the likely corresponding point pairs in the map for every pair of points in the compacted scene that is contained in the list of matched lines 22, and collecting the results into a list of likely matched lines 35.

(d) An elimination processor 36 for producing a reduced list of matched lines 24 by comparing the lists 22 and 35, and retaining only the matched lines that appear on both lists.

(3) Returning to FIG. 6, a processor 25 is used for systematically searching the list 24 to find a pair of congruent geometrical figures of the required minimum number of points, and if not found, rejecting the current scene and requesting a new current scene from the sensor system for processing. If a pair of congruent geometrical figures is found, it is sent to the next processor in the flowchart. The systematic search process is one of branching and backtracking through a series of steps until either a pair of congruent geometrical figures of the required number of points is found or the number of matched lines in the list is exhausted, including the steps of:

(a) selecting and permanently removing an initial pair of matched lines from the list 24 and advancing to the next higher step (b), (b) searching the list, using an efficient method such as a binary search, to find two pairs of matched lines to connect the initial pair of lines with a third pair of points and form a pair of congruent triangles, and if found: temporarily removing the two pairs of matched lines from the list and advancing to the next higher step (c), but if not found: restoring to the list all matched lines temporarily removed, and returning to (a) for a new initial pair of matched lines, (c) searching the list, using an efficient method such as a binary search, to find three pairs of matched liens to connect a new pair of points with all points in the congruent triangles and form a pair of congruent tetrahedrons, and if found: temporarily removing the three pairs of matched lines from the list and advancing up to the next higher step (d), but if not found: removing from the congruent triangles the two matched lines added in the adjacent lower step (b), restoring to the list any matched lines temporarily removed at this and higher steps, and returning to the adjacent lower step (b), (d) and all higher steps:
searching the list, using an efficient method such as a binary search, to find additional matched lines to connect a new pair of points with all points in the pair of congruent geometrical figures and form a pair of congruent geometrical figures containing an additional pair of points, and if found: temporarily removing the additional matched lines from the list and advancing to the next higher adjacent step, but if not found: removing from the congruent geometrical figures the matched lines added in the adjacent lower step, restoring to the list any matched lines temporarily removed at this and higher steps, and returning to the adjacent lower step to continue the search.

The spatial pattern recognition processor 20 is a key part of the invention. The list reduction processor 23 is the crucial component that gives the spatial pattern recognition processor its conspicuous efficiency. The sequential arrangement of the component processors and the separation of the arithmetic and symbolic operations, whereby the processors in parts (1) and (2) perform mainly numerical arithmetic operations, while those in part (3) perform only symbolic operations, have practical advantages. The former allows the use of multiple processors arranged in a production line for fast real time processing. The latter allows the use of separately optimized symbolic and arithmetic processors, which should be more efficient than using general purpose processors to perform both types of operations.

B.2.c Map update: Using the coordinates of the points contained in the congruent geometrical FIGS. 26, a processor 27 is used to for computing a least-squares-error coordinate transformation matrix to properly map the points in the compacted scene 19 into the map 7. Optionally, independent heading information from another instrument such as a magnetic compass may be used to confirm or improve the rotation component of the transformation. The use of independent heading information may reduce charting errors when the map is being extended into uncharted regions.

A processor 28 is used for updating the map with the contents of the current scene through the transformation matrix produced by 27, including the follow steps:

(a) mapping the points from the compacted scene into the map using the transformation matrix, (b) entering points mapped from the compacted scene into the map on a contingency basis where their confidence intervals do not overlap the confidence intervals of existing points in the map, (c) confirming existing points in the map where their confidence intervals overlap the confidence intervals of the mapped points, (d) removing points from the map that were entered on a contingency basis from previous scenes and lie within the field of view, but whose confidence intervals consistently fail to overlap those of points mapped from this and other compacted scenes B.2.d The vehicle velocity, position and orientation computation processor: A processor 29 is used for computing the position and orientation of the vehicle in the map by applying the transformation matrix produced by 27 to the vehicle orientation and position at the origin of the coordinate system of the compacted scene, compiling a time history of the position and orientation of the vehicle, and estimating the velocities of the vehicle from the time history.

B.3. Steering and speed correction processor Returning to FIG. 5, the steering and speed correction processor 16 is used for comparing the time history of the position and orientation of the vehicle produced by 15 with the desired course and speed dictated by the mission objectives 13, computing the corrective measures necessary to achieve and maintain the appropriate course and speed consistent with the mission objectives, and checking that the corrections are effective, by requesting a new current scene from the sensor system for processing at appropriate times. The corrective measures are put into effect by the steering and speed controller 17, thus closing the control loop.

C. Testing

The operation of the invention was tested by computer simulation. With reference to FIG. 5, an existing sonar system of the Applied Research Laboratories of the University of Texas at Austin was used as the sensor system 14 to generate the map 7 and the current scene 8 in a digital form. The essential components of the invention, which is contained in the position and orientation tracking processor 15, specifically the clustering processor 18 through the coordinate transformation matrix computation processor 27 in FIG. 6, were simulated in three stages:

(1) The first stage, which included the clustering processor 18, compacted scene 19, the list of matched lines compilation processor 21, list of matched lines 22, and the list of matched lines reduction processor 23, produced the the reduced list of matched lines 24. The first stage was simulated in a computer program called PREAT5, written in FORTRAN by Ann Clancy, and executed on a CDC CYBER 830 computer manufactured by the Control Data Corporation.

(2) The second stage, which included the congruent geometrical figures recognition processor 25, extracted the congruent geometrical FIGS. 26 from the reduced list of matched lines 24. The second stage was initially simulated in a computer program called LISPCODE-DEV-6, written LISP by Douglas K. Walker and executed on a Macintosh computer under the ExperLisp system. The Macintosh computer is manufactured by Apple Computer Inc. and the ExperLisp software system is produced by ExperTelligence Inc. However, LISPCODE-DEV-6 was found to occasionally give erroneous results. The problem was solved by replacing LIPSCODE-DEV-6 with a program called CFGIF, written by the applicant in Microsoft Excel macro language on a Macintosh computer. Microsoft Excel is a spreadsheet software system produced by the Microsoft Corporation.

(3) The third stage, which included the coordinate transformation matrix computation processor 27, computed a coordinate transformation matrix from the congruent geometrical FIGS. 26 provided by the second stage. The third stage was simulated in a program called SENSOR TRACKING, written by the applicant as a Microsoft Excel spreadsheet on a Macintosh computer.

Using real data from a moving sonar that was periodically sensing the seafloor, said coordinate transformation matrix obtained by said computer simulation was checked against independent references computed by acoustic and radio navigation methods. The test was repeated with several data sets. The test results indicated that the method of the invention is sound. Listings of the programs PREAT5, LISPCODE-DEV-6, CFGIF and SENSOR TRACKING are given in the Appendix.

PATENT APPLICATION OF

Nicholas P. Chotiros

For

METHOD AND APPARATUS FOR TRACKING, MAPPING AND RECOGNITION OF SPATIAL PATTERNS:

APPENDIX

PREAT5:

```
      PROGRAM PREAT5(INPUT,OUTPUT,TAPE1,TAPE3,TAPE4,TAPE5,TAPE2)

C  PREAT FINDS THE X AND Y COMPONENTS OF THE DISTANCE FROM
C  THE SONAR TO AN EVENT AND THE SIGNAL STRENGTH OF THAT EVENT.
C  PREAT ALSO FINDS THE DISTANCE BETWEEN 2 EVENTS IN A PING
C  AND ALL PAIRS OF EVENTS IN THE NEXT PING THAT HAVE THIS
C  SAME DISTANCE BETWEEN THEM (WITHIN +-DELTA) BUT GREATER THAN DISMIN.
C  NLINS CONTAINS THE LIKELIHOOD RATIOS THAT A POINT IS DESIREABLE
C  BASED ON THE COUNT OF THE NUMBER OF CORRESPONDING PAIRS
C  OF EVENTS.
C
C  TAPE1   INPUT FILE CONTAINING THE SONAR POSITION AT A PING
C          AND ALL THE EVENTS CORRESPONDING TO THAT PING.  THE X
C          AND Y POSITION OF EACH EVENT ARE ALSO PROVIDED.

C  TAPE3   OUTPUT FILE THAT LISTS MATCHING EVENTS FROM THE FIRST
C          PING IN A PING PAIR TO THE SECOND PING.

C  TAPE4   OUTPUT FILE WITH DEBUG DIAGNOSTICS.

C  TAPE5   OUTPUT FILE OF LIKELY MATCHED LINES BELONGING TO A
C          COMMON POLYGON.

COMMON /DATA1/ TPR2(70,2),AZIM(70,2),IEVENT(2),MATCH(70,2),
     +    XSNR(2),YSNR(2),MXEVTS
      COMMON /DATA2/ NLINS(70,70),RLINS(70,70)
      COMMON /STAT1/ NHIST(20,2)
      COMMON /MAT/ MATCN,MATCT,MATCNP
      COMMON /CONST/ TPI,PI,HPI

DIMENSION SBLIN(70,2),LMATCH(70,70)

EQUIVALENCE (LMATCH(1,1),RLINS(1,1))
      EQUIVALENCE (SBLIN(1,1),NLINS(1,1))
```

```
      DATA NLINM/70/
      DATA LINMAX/14000/

HPI = ASIN(1.0)
      PI = 2.*HPI
      TPI = 2.*PI

C  INPUT VALUES FROM USER

PRINT*,"ENTER MAXIMUM NUMBER OF EVENTS TO USE IN EACH PING"
      READ *,MXEVTS

PRINT*,"ENTER MAXIMUM AND MINIMUM TARGET NUMBERS TO BE USED"
      PRINT*,"FOR NONTARGET EVENTS ONLY, ENTER 0,0"
      READ*,ITGMAX,ITGMIN
      PRINT*,"ENTER MAXIMUM DISPLACEMENT BETWEEN PINGS (METERS)"
      READ*,DISMAX
      PRINT*,"ENTER MINIMUM NUMBER OF MATCHED LINES"
      READ*,LINMIN
      PRINT*,"ENTER DELTA TIME FOR POINT REDUCTION"
      READ*,DELTAT
      DELTT2 = DELTAT*2.
      PRINT*,"ENTER DELTA AZIMUTH FOR POINT REDUCTION"
      READ*,DELTAA
      DELTAA = DELTAA*PI/180.
      DELTA2 = DELTAA*2.
      PRINT*,"ENTER 1 TO TRACK ADJACENT PINGS, ENTER 2 TO TRACK ONE
     + PING WITH SUBSEQUENT PINGS"
      READ *,ITRACK

IF(MXEVTS.GT.NLINM) MXEVTS = NLINM
      TPRMAX = DISMAX*2./1500.

C  READ FIRST 2 LINES OF INPUT FILE CONTAINING RUNTIME INFO

READ(1,1400) ICOMM
      READ(1,1401)    ,IDATE,ITIME,IFREC,ILREC,RCANG1,RCANG2

C  PRINT OUT FIRST 2 LINES TO OUTPUT FILE

WRITE(5,1405) ICOMM,DELTA,DISMIN
      WRITE(5,1401) KEY,IDATE,ITIME,IFREC,ILREC,RCANG1,RCANG2
C
1400  FORMAT(6A10)
1405  FORMAT(6A10,1X,F5.2,F5.0)
1406  FORMAT(6A10,/
     1 "MAXIMUM AND MINIMUM TARGET NUMBERS ALLOWED = ",2I5/
     1 "MAXIMUM EVENTS CUTOFF = ",I5/
     1"MAXIMUM EXPECTED DISPLACEMENT BETWEEN PINGS (METERS) = ",F10.1/)
1401  FORMAT(3(A10,1X),5X,I3,2X,I3,2X,2(F6.3,2X))
C
C  SPLIT KEY TO FIND WHICH FAN IS USED
C
      DECODE(10,1404,KEY) IDK,IFAN
1404  FORMAT(A9,A1)
C
C  FIND NUMBER OF PINGS
C
      NPING = ILREC - IFREC
```

```
C  START PROCESSING BY PING

K = 1

C  ZERO NHIST ARRAY

DO 47 I=1,20
       DO 47 J=1,2
47     NHIST(I,J) = 0

C  ZERO STATISTICS ARRAY

MATCN = 0
       MATCT = 0
       WRITE(3,1400) ICOMM
       WRITE(3,1401) KEY,IDATE,ITIME,IFREC,ILREC,RCANG1,RCANG2
       PRINT(3,*) "POINT MATCHES AT DELTA"

DO 50 IPING = 1,NPING

IPG = IPING + IFREC - 1

PRINT(4,*) "ON PING ",IPG," OF ",IFREC," TO ",ILREC

PRINT(3,*) "PING PAIR ",IPING
       PRINT(3,*) "MATCHES FROM FIRST TO SECOND PING"

C  READ SONAR POSITION

5      READ(1,110) XSNR(K),YSNR(K)
       IF(XSNR(K).EQ.-1) GO TO 5
110    FORMAT(1X,2(F12.6,1X))

C  START PROCESSING EVENTS
C
       IEVENT(K) = 1

AZIML = 0.
       TPROPL = 0.

C  READ TARGET TYPE, PROP TIME, AZIMUTH, RETURN, AND BACKGROUND
C  FROM TAPE1.  PRINT VALUES FOR DEBUGGING TO TAPE4.

10     READ(1,120) ITARG,TPR2(IEVENT(K),K),AZIM(IEVENT(K),K),
      +    A,B,C,EVENTA1,EVENTA2
       IF(ITARG.EQ.-1) GO TO 15
       READ(1,120) Z,A,B,C,D,E,EVENTA2,EVENTB2
       PRINT(4,*) "Z= ",Z," A= ",A," C= ",C," EVENTA2= ",EVENTA2,
      +    " EVENTB2 = ",EVENTB2
       IF(IEVENT(K).GT.MXEVTS) GO TO 10
       IF((ITARG.GT.ITGMAX).OR.(ITARG.LT.ITGMIN)) GO TO 10
       IF((TPR2(IEVENT(K),K).EQ.TPROPL).AND.(AZIML.EQ.
      +        AZIM(IEVENT(K),K))) GO TO 10
       TPROPL = TPR2(IEVENT(K),K)
       AZIML = AZIM(IEVENT(K),K)

120    FORMAT(I4,1X,F8.6,4(F8.5,1X),1X,2(F6.0,1X))

C  CALCULATE SIGNAL STRENGTH.  TO DO THIS, DIVIDE THE RETURN
```

```
C  BY THE BACKGROUND.

C  EVENTA1    RETURN OF UPPER FAN
C  EVENTB1    RETURN OF LOWER FAN
C  EVENTA2    BACKGROUND OF UPPER FAN
C  EVENTB2    BACKGROUND OF LOWER FAN

IF(IFAN.EQ."U") GO TO 40
       IF(IFAN.EQ."L") GO TO 55

C  IF BOTH FANS ARE USED, FIND THE SIGNAL STRENGTH OF BOTH AND
C  CHOOSE THE LARGER.

SIG1 = EVENTA1/EVENTA2
       SIG2 = EVENTB1/EVENTB2
       SBLIN(IEVENT(K),K) = AMAX1(SIG1,SIG2)
       GO TO 60

C  SIGNAL STRENGTH IF ONLY THE UPPER FAN IS USED

40     SBLIN(IEVENT(K),K) = EVENTA1/EVENTA2
       GO TO 60

C  SIGNAL STRENGTH IF ONLY THE LOWER FAN IS USED

55     SBLIN(IEVENT(K),K) = EVENTB1/EVENTB2
60     CONTINUE

C  SEE IF THIS EVENT IS THE SAME AS A PREVIOUS ONE

IMOVE = 0
       IF(IEVENT(K).LT.2) GO TO 57

IJ2 = IEVENT(K)
       IJ1 = IJ2 - 1

C  IMOVE IS THE NUMBER OF EVENTS THAT ARE THE SAME AS
C  THE PRESENT ONE.

IMOVE = 0

C  SEE IF AZIMUTH AND PROP TIME OF THIS EVENT ARE WITHIN
C  THE GIVEN ALLOWED ERROR OF A PREVIOUS ONE.

56     CONTINUE
C DBUG PRINT(4,*) "K = ",K," IEVENT(K) = ",IEVENT(K)
C DBUG PRINT(4,*) "TPR2(2) - TPR2(1) = ",TPR2(IJ2,K)-TPR2(IJ1,K)
C DBUG PRINT(4,*) "AZIM(2) - AZIM(1) = ",AZIM(IJ2,K)-AZIM(IJ1,K)

IF((TPR2(IJ2,K) - TPR2(IJ1,K)).GT.(3.0*DELTT2)) GO TO 57
       IF(ABS(TPR2(IJ2,K) - TPR2(IJ1,K)).GT.DELTT2) GO TO 54
       IF(ABS(AZIM(IJ2,K) - AZIM(IJ1,K)).GT.DELTA2) GO TO 54

C  IF A DUPLICATE EVENT IS FOUND, UPDATE COUNTER AND FIND THE
C  WEIGHTED AVERAGE OF THE AZIMUTH AND PROPOGATION TIME (BY
C  S/B RATIO).

C  "IJ2" CORRESPONDS TO PRESENT PING VALUES.
C  "IJ1" CORRESPONDS TO A PREVIOUS PING'S VALUES.

IMOVE = IMOVE + 1
```

```
        AZIM(IJ1,K) = (AZIM(IJ1,K)*SBLIN(IJ1,K) + AZIM(IJ2,K)
      +              *SBLIN(IJ2,K))/(SBLIN(IJ2,K) + SBLIN(IJ1,K))
        TPR2(IJ1,K) = (TPR2(IJ1,K)*SBLIN(IJ1,K) + TPR2(IJ2,K)
      +              *SBLIN(IJ2,K))/(SBLIN(IJ2,K) + SBLIN(IJ1,K))
        SBLIN(IJ2,K) = SBLIN(IJ1,K) + SBLIN(IJ2,K)

C   AFTER UPDATING THE VALUES CORRESPONDING TO THE DUPLICATE EVENT,
C   ELIMINATE THE PRESENT EVENT.

TPR2(IJ2,K) = TPR2(IJ1,K)
        AZIM(IJ2,K) = AZIM(IJ1,K)
        GO TO 57

54      CONTINUE

C   CHECK NEXT EVENT.

IJ1 = IJ1 - 1
        IF(IJ1.EQ.0) GO TO 57
        GO TO 56

57      CONTINUE

C   UPDATE COUNTER TO KEEP TRACK OF NUMBER OF EVENTS
C DBUG PRINT(4,*) "IMOVE = ",IMOVE
        IEVENT(K) = IEVENT(K) + 1 - IMOVE
        NTMOVE = NTMOVE + IMOVE
C DBUG PRINT(4,*) "NTMOVE = ",NTMOVE

C   SEE IF ACTUAL NUMBER OF EVENTS GREATER THAN NUMBER ALLOWED

IF(IEVENT(K).GT.MXEVTS) PRINT*,
     1  "INPUT DATA LIMITED TO FIRST ",MXEVTS," POINTS ON PING ",IPING

C   READ NEXT EVENT

GO TO 10

C   CORRECT NUMBER OF EVENTS

15      IEVENT(K) = IEVENT(K) - 1

C DBUG PRINT(4,*) "# OF EVENTS IS ",IEVENT(K)
C DBUG PRINT(4,*) "AFTER ELIMINATING EVENTS"

IDUM = IEVENT(K)
        DO 59 IK2 = 1,IDUM
        PRINT*,"K = ",K," IEVENT = ",IEVENT(K)
        PRINT(4,*) "TPR2 = ",TPR2(IK2,K)," AZIM = ",AZIM(IK2,K)
59      CONTINUE

C   SORT BY RANGE TO ALLOW ONLY POINTS WITHIN RANGE TO BE
C   SELECTED FOR LINE MATCHING

CALL ASORT(K)
        IF(K.NE.1) GO TO 180
        WRITE(5,450) IEVENT(1),XSNR(1),YSNR(1)
        IF(IEVENT(1).LE.1) GO TO 5
        K = 2
        GO TO 5
```

```
180     CONTINUE

IEVENT1 = IEVENT(1)
        IEVENT2 = IEVENT(2)

WRITE(5,450) IEVENT2,XSNR(2),YSNR(2)

C   SET UP LOOPS TO COMPARE THE DISTANCE BETWEEN 2 EVENTS IN
C   ONE PING AND 2 EVENTS IN THE NEXT PING.  EACH DISTANCE IN
C   THE FIRST PING MUST BE COMPARED WITH EACH DISTANCE IN THE
C   SECOND PING.  THAT'S WHY THERE ARE FOUR NESTED LOOPS!
C   INDICES I AND J PERTAIN TO THE FIRST PING.  I2 AND J2
C   PERTAIN TO THE SECOND PING.

C   TO SAVE TIME LINE DISTANCE BOUNDS IN THE SECOND PING WILL BE COMPUTED
C   AND SAVED IN THE ARRAY RLINS(I2,J2) FOR EFFICIENCY.
C   THE UPPER BOUND IS SAVED IN RLINS(I2,J2), LOWER BOUND IN
C   RLINS(J2,I2).

IF(IEVENT(2).LE.1) GO TO 50
        DO 184 I2 = 2, IEVENT2
        J11 = I2 - 1

DO 183 J2 = 1, J11
        CALL DISTAN(2,I2,J2,DELTAT,DELTAA,DMIN,DMAX)
        RLINS(I2,J2) = DMAX
        RLINS(J2,I2) = DMIN

183     CONTINUE
184     CONTINUE

I2S1 = 2
        I2E1 = 2

NLMCH = 0
        NEXTRA = 0

DO 209 I = 1,MXEVTS
        DO 209 J = 1,MXEVTS
209     NLINS(I,J) = 0

DO 130 I = 2,IEVENT1

C   FIND SEARCH SPACE BOUNDARIES

CALL ASERCH(I,1,I2S1,I2E1,2,TPRMAX)

C       PRINT(4,*) "I2S1,I2E1 = ",I2S1,I2E1

J1 = I - 1
        J2S1 = 1
        J2E1 = 1

DO 140 J = 1,J1

CALL ASERCH(J,1,J2S1,J2E1,2,TPRMAX)

C       PRINT(4,*) "J2S1,J2E1 = ",J2S1,J2E1
        CALL DISTAN(1,I,J,DELTAT,DELTAA,DMIN,DMAX)

I2S2 = MAX0(2,I2S1)
```

```
        IF(I2S2.GT.I2E1) GO TO 140

DO 150 I2 = I2S2,I2E1

J11 = I2 - 1
        J11 = MIN0(J11,J2E1)

IF(J2S1.GT.J11) GO TO 150

DO 160 J2 = J2S1,J11

C   COLLECT POINT MATCH STATISTICS

IF((DMIN.GT.RLINS(I2,J2)).OR.(DMAX.LT.RLINS(J2,I2)))
      +     GO TO 160

NLINS(I,I2) = NLINS(I,I2) + 1
        NLINS(I,J2) = NLINS(I,J2) + 1
        NLINS(J,I2) = NLINS(J,I2) + 1
        NLINS(J,J2) = NLINS(J,J2) + 1

160     CONTINUE
150     CONTINUE

140     CONTINUE

130     CONTINUE

C   SEARCH FOR PEAKS IN POINT MATCH STATISTICS

CALL LIKMCH(LINMIN)

C   TEST IF LINES BETWEEN POINT PAIRS WITH PEAK POINT MATCH
C   LIKELIHOODS ARE VALID LINE MATCHES AND OUTPUT POSSIBLE
C   AND LIKELY MATCHES.

CALL SCREEN(NLMCH,DELTAT,DELTAA,LINMIN)

IF(IPING.NE.1) GO TO 170

C   WRITE SONAR POSITION AND EVENT POSITIONS OF FIRST PING TO
C   TAPE 2.

WRITE(2,450) IEVENT1,XSNR(1),YSNR(1)
        CALL XYOUT(1)

450     FORMAT(I4,5X,2F8.1)

170     CONTINUE

C   WRITE SONAR POSITION AND EVENT POSITIONS TO TAPE 2.

WRITE(2,450) IEVENT2, XSNR(2), YSNR(2)
        CALL XYOUT(2)

C       DO 171 J=1,IEVENT2
C       WRITE(5,452) J,MATCH(J,2)
```

```
C452      FORMAT(I4,2X,I4)
C         IF(MATCH(J,2).EQ.0) MATCH(J,2) = J
C1402     FORMAT(I3,1X,F9.4,1X,F10.4,1X,I6,1X,F9.4,1X,F10.4)
C171      CONTINUE

C         WRITE(5,451) IEVENT1
C451      FORMAT(I3)

C         DO 172 I=1,IEVENT1
C         WRITE(5,452) I,MATCH(I,1)
C172      CONTINUE

C         PRINT(3,*) "TOTAL MATCHES IN MATCH ARRAY IS ",MATCNP

C  IF TRACKING ADJACENT PINGS, STORE SECOND PING DATA INTO ARRAY
C  FOR FIRST PING.  SECOND PING BECOMES FIRST PING NEXT COMPARISON.

C  IF TRACKING ONE PING TO SUBSEQUENT PINGS, THE FIRST PING WILL
C  NOT CHANGE.

IF(ITRACK.EQ.2) GO TO 149

IEVENT(1) = IEVENT(2)
          XSNR(1)= XSNR(2)
          YSNR(1) = YSNR(2)

DO 190 L2 = 1,IEVENT2
          AZIM(L2,1) = AZIM(L2,2)
          TPR2(L2,1) = TPR2(L2,2)
190       CONTINUE

149       CONTINUE

K = 2
C  GET SECOND PING DATA

PRINT*,"FINISHED PING NUMBER ",IPING," OUT OF ",NPING
50        CONTINUE

C  STOP IF AT END OF FILE

30        CONTINUE

END

SUBROUTINE ASORT(INX)

C  SORT SORTS THE PROP TIME N FROM LOWEST TO HIGHEST
C  INX SELECTS EITHER THE FIRST OR SECOND PING (1 OR 2)
C  OF THE TWO PINGS BEING MATCHED

COMMON /DATA1/ TPR2(70,2),AZIM(70,2),IEVENT(2),MATCH(70,2),
         +      XSNR(2),YSNR(2),MXEVTS
          COMMON /DATA2/ NLINS(70,70),RLINS(70,70)
          COMMON /STAT1/ NHIST(20,2)
          COMMON /MAT/ MATCN,MATCT,MATCNP
          COMMON /CONST/ TPI,PI,HPI

DIMENSION SBLIN(70,2),LMATCH(70,70)
```

```
      EQUIVALENCE (LMATCH(1,1),RLINS(1,1))
      EQUIVALENCE (SBLIN(1,1),NLINS(1,1))

ILM = IEVENT(1)
      JLM = IEVENT(2)

L3 = IEVENT(INX)

DO 70 J = 2,L3

L2 = IEVENT(INX) - 1

DO 80 K = 1,L2

IF(TPR2(J,INX).GE.TPR2(K,INX)) GO TO 80

T1 = AZIM(J,INX)
      AZIM(J,INX) = AZIM(K,INX)
      AZIM(K,INX) = T1

T1 = TPR2(J,INX)
      TPR2(J,INX) = TPR2(K,INX)

TPR2(K,INX) = T1

80    CONTINUE
70    CONTINUE
      RETURN
      END
C
      SUBROUTINE ASERCH(I,K1,ISTART,IEND,K2,TPRMAX)
C   SUBROUTINE TO SEARCH FOR THE BOUNDARIES ISTART AND IEND OF THE INDEX
C J
C   OF ARRAY RANGE(J,K2) FOR WHICH RANGE(J,K2) IS
C   OF THE SAME VALUE AS RANGE(I,K1) WITHIN A MARGIN OF
C   PLUS OR MINUS DISMAX
C   IT IS ASSUMED THAT ARRAYS RANGE(I,K1) AND RANGE(J,K2) ARE
C   SORTED IN ASCENDING ORDER
C   THE SEARCH FOR ISTART STARTS FROM THE INPUT VALUE OF ISTART
C   AND FOR IEND STARTS FROM THE INPUT VALUE OF IEND

COMMON /DATA1/ TPR2(70,2),AZIM(70,2),IEVENT(2),MATCH(70,2),
     +      XSNR(2),YSNR(2),MXEVTS
      COMMON /DATA2/ NLINS(70,70),RLINS(70,70)
      COMMON /STAT1/ NHIST(20,2)
      COMMON /MAT/ MATCN,MATCT,MATCNP
      COMMON /CONST/ TPI,PI,HPI

DIMENSION SBLIN(70,2),LMATCH(70,70)

EQUIVALENCE (LMATCH(1,1),RLINS(1,1))
      EQUIVALENCE (SBLIN(1,1),NLINS(1,1))

IST1 = ISTART
      IST2 = IEND
      RANGT = TPR2(I,K1)-TPRMAX
      IEVENT2 = IEVENT(K2)
      DO 55 I1 = IST1,IEVENT2
      IF (TPR2(I1,K2).LT.RANGT) GO TO 55
      ISTART = I1
```

```
              GO TO 56
55            CONTINUE
              ISTART = IEVENT2
56            CONTINUE
              RANGT = TPR2(I,K1) + TPRMAX
C
              DO 65 I1 = IST2,IEVENT2
              IF (TPR2(I1,K2).LE.RANGT) GO TO 65
              IEND = I1
              GO TO 66

65            CONTINUE
              IEND = IEVENT2
66            CONTINUE
              RETURN
              END
C
              SUBROUTINE DISTAN(INX,I,J,DELTAT,DELTA2,DMIN,DMAX)

C   THIS SUBROUTINE WILL FIND THE UPPER AND LOWER BOUNDS OF THE
C   SQUARED DISTANCE BETWEEN TWO POINTS I AND J WITH AZIMUTH
C   ERROR OF PLUS/MINUS DELTAA AND TIME DELAY ERROR OF PLUS/MINUS
C   DELTAT .   DELTA2 = 2.*DELTAA    DELTT2 = 2.*DELTAT

COMMON /DATA1/ TPR2(70,2),AZIM(70,2),IEVENT(2),MATCH(70,2),
             +        XSNR(2),YSNR(2),MXEVTS
              COMMON /DATA2/ NLINS(70,70),RLINS(70,70)
              COMMON /STAT1/ NHIST(20,2)
              COMMON /MAT/ MATCN,MATCT,MATCNP
              COMMON /CONST/ TPI,PI,HPI

DIMENSION SBLIN(70,2),LMATCH(70,70)

EQUIVALENCE (LMATCH(1,1),RLINS(1,1))

EQUIVALENCE (SBLIN(1,1),NLINS(1,1))

ADIF = AZIM(I,INX) - AZIM(J,INX)
              ADIF = ABS(ADIF)
              IF(ADIF.GT.TPI) ADIF = ADIF - TPI
              IF(ADIF.GT.PI) ADIF = TPI - ADIF

ADIFU = ADIF + DELTA2
              ADIFL = ADIF - DELTA2
              IF(ADIFL.LT.0.) ADIFL = 0.
              IF(ADIFU.GT.PI) ADIFU = PI

CSU = COS(ADIFU)
              CSL = COS(ADIFL)

RMAX = AMAX1(TPR2(I,INX),TPR2(J,INX))
              RMIN = AMIN1(TPR2(I,INX),TPR2(J,INX))

RMAXU = RMAX + DELTAT
              RMAXL = RMAX - DELTAT
              RMINU = RMIN + DELTAT
              RMINL = RMIN - DELTAT
              IF(RMINU.LT.0.) RMINU = 0.

IF(RMINL.LT.0.) RMINL = 0.
              IF((RMAX/RMIN).GT.CSU) GO TO 10
```

```
        T1 = RMINU
        RMINU = RMINL
        RMINL = T1

10      CONTINUE

DMAX = (RMAXU**2.) + (RMINU**2.) - (2.*RMAXU
     +         *RMINU*CSU)
        DMIN = (RMAXL**2.) + (RMINL**2.) - (2.*RMAXL
     +         *RMINL*CSL)

RETURN
        END
C
C
        SUBROUTINE SCREEN(NLMCH,DELTAT,DELTAA,LINMIN)

C  THIS SUBROUTINE USES THE LIKELY POINT MATCHES IN ARRAY MATCH
C  TO SCREEN THE LINE MATCHES IN ARRAY LINMCH AND OUTPUTS THE

C  MOST LIKELY LINE MATCHES.

COMMON /DATA1/ TPR2(70,2),AZIM(70,2),IEVENT(2),MATCH(70,2),
     +          XSNR(2),YSNR(2),MXEVTS
        COMMON /DATA2/ NLINS(70,70),RLINS(70,70)
        COMMON /STAT1/ NHIST(20,2)
        COMMON /MAT/ MATCN,MATCT,MATCNP
        COMMON /CONST/ TPI,PI,HPI

DIMENSION SBLIN(70,2),LMATCH(70,70)

EQUIVALENCE (LMATCH(1,1),RLINS(1,1))
        EQUIVALENCE (SBLIN(1,1),NLINS(1,1))

ILM = IEVENT(1)
        JLM = IEVENT(2)

C  ZERO LMATCH

DO 100 I = 1,ILM
        DO 100 J = 1,JLM
100     LMATCH(I,J) = 0

DO 200 I=2,ILM
        IF(MATCH(I,1).EQ.0) GO TO 200
        IDAT = (I-1)*MXEVTS
        J11 = I - 1

DO 210 J=1,J11
        IF(MATCH(J,1).EQ.0) GO TO 210
        I2 = MAX0(MATCH(I,1),MATCH(J,1))
        J2 = MIN0(MATCH(I,1),MATCH(J,1))
        CALL DISTAN(1,I,J,DELTAT,DELTAA,DMIN,DMAX)
        CALL DISTAN(2,I2,J2,DELTAT,DELTAA,DMIN2,DMAX2)
        IF((DMAX2.LT.DMIN).OR.(DMIN2.GT.DMAX)) GO TO 210

LMATCH(I,I2) = LMATCH(I,I2) + 1
        LMATCH(J,I2) = LMATCH(J,I2) + 1
        LMATCH(I,J2) = LMATCH(I,J2) + 1
        LMATCH(J,J2) = LMATCH(J,J2) + 1
```

```
              WRITE(5,1407) I,J,I2,J2
1407          FORMAT(4I4)

210           CONTINUE
200           CONTINUE

DO 220 I2 = 2,JLM
              IF(MATCH(I2,2).EQ.0) GO TO 220
              IDAT = (I2-1)*MXEVTS
              J11 = I2 - 1

DO 230 J2 = 1,J11
              IF(MATCH(J2,2).EQ.0) GO TO 230
              I = MAX0(MATCH(I2,2),MATCH(J2,2))
              J = MIN0(MATCH(I2,2),MATCH(J2,2))
              CALL DISTAN(2,I2,J2,DELTAT,DELTAA,DMIN2,DMAX2)
              CALL DISTAN(1,I,J,DELTAT,DELTAA,DMIN,DMAX)
              IF((DMAX2.LT.DMIN).OR.(DMIN2.GT.DMAX)) GO TO 230

LMATCH(I,I2) = LMATCH(I,I2) + 1
              LMATCH(J,I2) = LMATCH(J,I2) + 1
              LMATCH(I,J2) = LMATCH(I,J2) + 1
              LMATCH(J,J2) = LMATCH(J,J2) + 1

WRITE(5,1407) I,J,I2,J2

230           CONTINUE

220           CONTINUE

C COLLECT PEAKS IN LMATCH

DO 310 I = 1,ILM
              NMAX = LINMIN
              JMAX = 0

DO 305 J = 1,JLM
              IF(NMAX.GT.LMATCH(I,J)) GO TO 305
              NMAX = LMATCH(I,J)
              JMAX = J
305           CONTINUE
              IF(JMAX.EQ.0) GO TO 310
              CALL PTEST(I,JMAX,DELTAT,DELTAA,IYN)
              PRINT(3,*) I,JMAX,IYN
310           CONTINUE

DO 320 J = 1,JLM
              NMAX = LINMIN
              IMAX = 0

DO 315 I = 1,ILM

IF(NMAX.GT.LMATCH(I,J)) GO TO 315
              NMAX = LMATCH(I,J)
              IMAX = I
315           CONTINUE
              IF(IMAX.EQ.0) GO TO 320
              CALL PTEST(IMAX,J,DELTAT,DELTAA,IYN)
              PRINT(3,*) IMAX,J,IYN

320           CONTINUE
```

```
        RETURN
        END
C
        SUBROUTINE LIKMCH(LINMIN)

C  THIS SUBROUTINE WILL FIND THE UPPER AND LOWER BOUNDS OF THE
C  SQUARED DISTANCE BETWEEN TWO POINTS I AND J WITH AZIMUTH ERROR
C  OF PLUS/MINUS DELTAA AND TIME DELAY ERROR OF PLUS/MINUS DELTAT.
C  DELTA2 = 2.*DELTAA    DELTT2 = 2.*DELTAT

COMMON /DATA1/ TPR2(70,2),AZIM(70,2),IEVENT(2),MATCH(70,2),
      +         XSNR(2),YSNR(2),MXEVTS
        COMMON /DATA2/ NLINS(70,70),RLINS(70,70)

COMMON /STAT1/ NHIST(20,2)
        COMMON /MAT/ MATCN,MATCT,MATCNP
        COMMON /CONST/ TPI,PI,HPI

DIMENSION SBLIN(70,2),LMATCH(70,70)

EQUIVALENCE (LMATCH(1,1),RLINS(1,1))
        EQUIVALENCE (SBLIN(1,1),NLINS(1,1))
        IEVENT1 = IEVENT(1)
        IEVENT2 = IEVENT(2)

DO 20 I = 1,IEVENT1
        NMAX = LINMIN
        MATCH(I,1) = 0

DO 10 J = 1,IEVENT2
        PRINT(4,*) "NLINS(",I,",",J,") = ",NLINS(I,J)
        IF(NMAX.GT.NLINS(I,J)) GO TO 10
        NMAX = NLINS(I,J)
        MATCH(I,1) = J
        PRINT(4,*) "MATCH(",I,",1) = ",J

10      CONTINUE
20      CONTINUE

DO 40 J = 1,IEVENT2
        NMAX = LINMIN
        MATCH(J,2) = 0

DO 30 I = 1,IEVENT1
        IF(NMAX.GT.NLINS(I,J)) GO TO 30
        NMAX = NLINS(I,J)
        MATCH(J,2) = I
        PRINT(4,*) "MATCH(",J,",2) = ",I

30      CONTINUE
40      CONTINUE

RETURN
        END
C
        SUBROUTINE XYOUT(INX)

C  THIS SUBROUTINE COMPUTES EVENT X,Y POSITION RELATIVE TO THE SONAR.
```

```fortran
      COMMON /DATA1/ TPR2(70,2),AZIM(70,2),IEVENT(2),MATCH(70,2),
     +               XSNR(2),YSNR(2),MXEVTS
      COMMON /DATA2/ NLINS(70,70),RLINS(70,70)
      COMMON /STAT1/ NHIST(20,2)
      COMMON /MAT/ MATCN,MATCT,MATCNP
      COMMON /CONST/ TPI,PI,HPI

ILM = IEVENT(INX)

DO 10 I = 1,ILM

SLRANG = TPR2(I,INX)*750.
      YDIS = SLRANG*COS(AZIM(I,INX))
      XDIS = -SLRANG*SIN(AZIM(I,INX))

WRITE(2,1403) I,XDIS,YDIS
1403  FORMAT(I3,2F9.2)

10    CONTINUE

RETURN
      END
C

SUBROUTINE PTEST(I,J,DELTAT,DELTAA,IYN)

C SUBROUTINE TO TEST FOR POINT MATCHES BY TESTING FOR BOUNDARY
C LINE CROSSINGS OF THE UNCERTAINTY SPACE.

COMMON /DATA1/ TPR2(70,2),AZIM(70,2),IEVENT(2),MATCH(70,2),
     +         XSNR(2),YSNR(2),MXEVTS
      COMMON /DATA2/ NLINS(70,70), RLINS(70,70)
      COMMON /STAT1/ NHIST(20,2)
      COMMON /MAT/ MATCN,MATCT,MATCNP
      COMMON /CONST/ TPI,PI,HPI
      DIMENSION TPRD(2,2),AZMD(2,2),IAT(2,5)
      DIMENSION X1(2),X2(2),Y1(2),Y2(2),N1(2)

C CREATE BOUNDARY LINE IN RANGE

TPRD(1,1) = TPR2(I,1) - DELTAT
      TPRD(2,1) = TPR2(I,1) + DELTAT
      TPRD(1,2) = TPR2(J,2) - DELTAT
      TPRD(2,2) = TPR2(J,2) + DELTAT

C CREATE BOUNDARY LINE IN AZIMUTH

AZMD(1,1) = AZIM(I,1) - DELTAA
      AZMD(2,1) = AZIM(I,1) + DELTAA
      AZMD(1,2) = AZIM(J,2) - DELTAA
      AZMD(2,2) = AZIM(J,2) + DELTAA

C SET UP ARRAY NUMBERING CORNERS OF UNCERTAINTY SPACE

IAT(1,1) = 1
      IAT(2,1) = 1
      IAT(1,2) = 1
      IAT(2,2) = 2
      IAT(1,3) = 2
      IAT(2,3) = 2
      IAT(1,4) = 2
```

```
        IAT(2,4) = 1
        IAT(1,5) = 1
        IAT(2,5) = 1

C   START LOOP TO SEE IF LINES INTERSECT

IYN = "NO"

DO 20 N1A = 1,4
        N1(1) = N1A
        DO 20 N2A = 1,4
        N1(2) = N2A

C   IF 2 INTERSECTING LINES HAVE BEEN FOUND, DON'T CHECK OTHER
C   BOUNDARY LINES.

IF(IYN.EQ."YES") GO TO 20

C   CONVERT AZIMUTH AND RANGE TO X AND Y TO SET UP THE UNCERTAINTY
C   SPACE.

DO 10 JK = 1,2
        N1 = N1(JK)
        SL1 = TPRD(IAT(1,N1),JK)*750.
        X1(JK) = XSNR(JK) - SL1*SIN(AZMD(IAT(2,N1),JK))
        Y1(JK) = YSNR(JK) + SL1*COS(AZMD(IAT(2,N1),JK))

SL2 = TPRD(IAT(1,(N1+1)),JK)*750.
        X2(JK) = XSNR(JK) - SL2*SIN(AZMD(IAT(2,(N1+1)),JK))
        Y2(JK) = YSNR(JK) + SL2*COS(AZMD(IAT(2,(N1+1)),JK))

10      CONTINUE

C   TEST IF LINE FROM X1(1),Y1(1) TO X2(1),Y2(1) (LINE 1) CROSSES
C   LINE FROM X1(2),Y1(2) TO X2(2),Y2(2) (LINE 2).  IF YES THEN
C   SET IYN TO "YES".

C   WE WANT TO RE-MAP THE LINES PUTTING X1(1),Y1(1) AT (0,0). SET X1(1),
C   Y1(1) TO 0,0 AND SUBTRACT THE SHIFT FROM THE OTHER 3 ENDPOINTS.

X2(1) = X2(1) - X1(1)
        Y2(1) = Y2(1) - Y1(1)
        X1(2) = X1(2) - X1(1)
        Y1(2) = Y1(2) - Y1(1)
        X2(2) = X2(2) - X1(1)
        Y2(2) = Y2(2) - Y1(1)
        X1(1) = 0.
        Y1(1) = 0.

C   ROTATE LINE 1 SO THAT IT IS ON THE X AXIS.  ROTATE LINE 2 BY THE
C   SAME AMOUNT.  THETA IS THE ANGLE TO ROTATE THROUGH.

HYP = SQRT(X2(1)*X2(1) + Y2(1)*Y2(1))
        CTHETA = X2(1)/HYP

STHETA = Y2(1)/HYP

X = X2(1)
        X2(1) = CTHETA*X2(1) + STHETA*Y2(1)
        Y2(1) = -STHETA * X + CTHETA*Y2(1)
```

```
              X = X1(2)
              X1(2) = CTHETA*X1(2) + STHETA*Y1(2)
              Y1(2) = -STHETA*X + CTHETA*Y1(2)

X = X2(2)
              X2(2) = CTHETA*X2(2) + STHETA*Y2(2)
              Y2(2) = -STHETA*X + CTHETA*Y2(2)

C     CHECK TO SEE IF ONE OF THE ENDPOINTS OF LINE 2 IS ON THE
C     X AXIS.

IF((Y1(2).EQ.0.).OR.(Y2(2).EQ.0)) GO TO 30

C     IF LINE 2 DOES NOT HAVE AN ENDPOINT ON THE X AXIS, SEE IF IT
C     CROSSES LINE 1 BY CHECKING THE SIGNS OF THE Y COMPONENTS OF
C     THE ENDPOINTS.  IF THE SIGNS ARE DIFFERENT, LINE 2 INTERSECTS
C     LINE 1. IF THE SIGNS ARE THE SAME, GO TO THE END OF THE LOOP.

IF((Y1(2).GE.0.).AND.(Y2(2).GE.0.)) GO TO 20
              IF((Y1(2).LT.0.).AND.(Y2(2).LT.0.)) GO TO 20

C     SEE IF THE INTERSECTION IS WITHIN THE ENDPOINTS OF LINE 1.
C     IF IT IS, SET IYN = "YES" AND GO TO THE END OF THE LOOP.
C     XCROSS IF WHERE THE INTERSECTION OCCURS.

XCROSS = (X1(2)*ABS(Y2(2)) + X2(2)*ABS(Y1(2)))/
     +                 (ABS(Y2(2)) + ABS(Y1(2)))
              IF((XCROSS.LE.X2(1)).AND.(XCROSS.GE.0.)) IYN = "YES"
              GO TO 20

30            CONTINUE

C     ONE OR TWO ENDPOINTS OF LINE 2 ALSO LIE ON THE X AXIS.  SEE IF
C     THE INTERSECTION OCCURS WITHIN THE BOUNDARY SPACE.

IF(Y1(2).EQ.0.) GO TO 60
              IF((X2(2).GE.0.).AND.(X2(2).LE.X2(1))) IYN = "YES"
              GO TO 20

60            IF((X1(2).GE.0.).AND.(X1(2).LE.X2(1))) IYN = "YES"

20            CONTINUE
              RETURN
              END
```

LISPCODE-DEV-6:

```
;**** FUNCTION - READS PING DATA *****
(DEFUN READ-PING (FILE NPAIRS)
    (PRINT 'ENTERING-READ-PING)
    (SETQ KT 1)
    (DOTIMES (COUNT NPAIRS)
        (FILE COUNT (LIST (READ FILE1) (READ FILE1) (READ FILE1)
                   (READ FILE1))) (SETQ KT (ADD1 KT))
    )
    (PRINT 'EXITING-READ-PING) (PRINT KT)
)
;************ FUNCTION TRANSLATE **********************
(DEFUN TRANSLATE (ARRY ARRY-STORE)
    (PROG ()
      LOOP1
```

```
         (COND ((= (LENGTH MLIST2) 0) (PRINT (/ X TRICNT))
                (PRINT (/ Y TRICNT)) (RETURN MLIST2)))
         (SETQ A1 (CAR MLIST2))
         (SETQ A2 (CADDR MLIST2))
         (SETQ MLIST2 (CDDDR MLIST2))
         (SETQ X 0)
         (SETQ Y 0)
         (SETQ X (+ X (+ (+ (- (ARRY (CADDR A1) 1) (ARRY-STORE
                 (CAR A1) 1)) (- (ARRY (CADDDR A1) 1) (ARRY-STORE
                 (CADR A1) 1))) (- (ARRY (CADDDR A2) 1)
                 (ARRY-STORE (CADR A2) 1)))))
         (SETQ Y (+ Y (+ (+ (- (ARRY (CADDR A1) 2) (ARRY-STORE
                 (CAR A1) 2)) (- (ARRY (CADDDR A1) 2) (ARRY-STORE
                 (CADR A1) 2))) (- (ARRY (CADDDR A2) 2)
                 (ARRY-STORE (CADR A2) 2)))))
         (COND ((= TRICNT 3) (GO LOOP1)))
         (SETQ A1 (CADDR MLIST2))
         (SETQ MLIST2 (CDDDR MLIST2))
         (SETQ X (+ X (- (ARRY (CADDR A1) 1) (ARRY-STORE
                 (CADR A1) 1))))
         (SETQ Y (+ Y (- (ARRY (CADDR A1) 2) (ARRY-STORE
                 (CADR A1) 2))))
         (COND ((= TRICNT 4) (GO LOOP1)))
         (SETQ A1 (CADDR MLIST2))
         (SETQ MLIST2 (CDDDR MLIST2))
         (SETQ X (+ X (- (ARRY (CADDR A1) 1) (ARRY-STORE
                 (CADR A1) 1))))
         (SETQ Y (+ Y (- (ARRY (CADDR A1) 2) (ARRY-STORE
                 (CADR A1) 2))))
         (GO LOOP1)
))
;
;
;********* FUNCTION LINEMATCH ***************
(DEFUN LINEMATCH (KNT CNT POINTER)
    (COND ((> CNT NPAIRS) T)
          ((AND (EQUATE (LIST (CAR (ARRY CNT)) (CADR (ARRY CNT)))
                        (LIST (CAR (ARRY-STORE KNT))
                              (CADR (ARRY-STORE KNT))))
                (EQUATE (LIST (CADDR (ARRY CNT)) (CADDDR (ARRY CNT)))
                        (LIST (CADDR (ARRY-STORE KNT))
                              (CADDDR (ARRY-STORE KNT)))))
           (ARRY-STORE POINTER (ARRY CNT))
           (ARRY CNT NIL)
           (SETQ POINTER (ADD1 POINTER))
           (LINEMATCH KNT (ADD1 CNT) POINTER))
          (T (LINEMATCH KNT (ADD1 CNT) POINTER))))
;
;************ FUNCTION EQUATE ***********************
(DEFUN EQUATE (LST1 LST2)
     (COND ((OR (AND (EQUAL (CAR LST1) (CAR LST2))
                     (EQUAL (CADR LST1) (CADR LST2)))
                (AND (EQUAL (CAR LST1) (CADR LST2))
                     (EQUAL (CADR LST1) (CAR LST2)))) T)
           (T NIL)))
;
;*********** FUNCTION REMOVE **************************
(DEFUN REMOVELST (LIST1 NPAIRS)
     (PROG (CT CT2)
     (SETQ CT 0)
     LOOP1
     (COND ((> CT 2) (RETURN T)))
```

```
              (SETQ CT (ADD1 CT))
              (SETQ RLIST (CAR LIST1))
              (SETQ LIST1 (CDR LIST1))
              (SETQ CT2 0)
              LOOP2
                 (COND ((= CT2 NPAIRS) (GO LOOP1)))
                 (COND ((EQUAL RLIST (ARRY CT2)) (ARRY CT2 NIL) (GO LOOP1))
                       (T (SETQ CT2 (ADD1 CT2)) (GO LOOP2)))
))
;*********** FUNCTION MATCH-LINE ***********************
(DEFUN MATCH-LINE (PT NPAIRS)
     (PROG (CT)
     (COND ((> PT 1) (RETURN T)))
     (SETQ CT -1)
     LOOP
     (COND ((= CT NPAIRS) (GO ERROR)))
     (SETQ LIST1 MLIST1)
     (SETQ CT (ADD1 CT))
     (COND ((AND (EQUAL (CAR (ARRY-STORE PT)) (CAR (ARRY CT)))
                 (OR (EQUAL (CADDR (ARRY-STORE PT)) (CADDR (ARRY CT)))
                     (EQUAL (CADDR (ARRY-STORE PT)) (CADDDR (ARRY CT)))
                     (EQUAL (CADDDR (ARRY-STORE PT)) (CADDR (ARRY CT)))
                     (EQUAL (CADDDR (ARRY-STORE PT)) (CADDDR (ARRY CT))))
                 (NOT (EQUAL (ARRY-STORE PT) (ARRY CT)))
                 (NOT (EQUATE (CDDR (ARRY-STORE PT)) (CDDR (ARRY CT)))))
             (SETQ LIST1 (CONS (ARRY CT) LIST1))
             (GO LOOP2))
           ((AND (EQUAL (CAR (ARRY-STORE PT)) (CADR (ARRY CT)))
                 (OR (EQUAL (CADDR (ARRY-STORE PT)) (CADDR (ARRY CT)))
                     (EQUAL (CADDR (ARRY-STORE PT)) (CADDDR (ARRY CT)))
                     (EQUAL (CADDDR (ARRY-STORE PT)) (CADDR (ARRY CT)))
                     (EQUAL (CADDDR (ARRY-STORE PT)) (CADDDR (ARRY CT))))
                 (NOT (EQUAL (ARRY-STORE PT) (ARRY CT)))
                 (NOT (EQUATE (CDDR (ARRY-STORE PT)) (CDDR (ARRY CT)))))
             (SETQ LIST1 (CONS (ARRY CT) LIST1))
             (GO LOOP2))
           ((AND (EQUAL (CADR (ARRY-STORE PT)) (CAR (ARRY CT)))
                 (OR (EQUAL (CADDR (ARRY-STORE PT)) (CADDR (ARRY CT)))
                     (EQUAL (CADDR (ARRY-STORE PT)) (CADDDR (ARRY CT)))
                     (EQUAL (CADDDR (ARRY-STORE PT)) (CADDR (ARRY CT)))
                     (EQUAL (CADDDR (ARRY-STORE PT)) (CADDDR (ARRY CT))))
                 (NOT (EQUAL (ARRY-STORE PT) (ARRY CT)))
                 (NOT (EQUATE (CDDR (ARRY-STORE PT)) (CDDR (ARRY CT)))))
             (SETQ LIST1 (CONS (ARRY CT) LIST1))
             (GO LOOP2))
           ((AND (EQUAL (CADR (ARRY-STORE PT)) (CADR (ARRY CT)))
                 (OR (EQUAL (CADDR (ARRY-STORE PT)) (CADDR (ARRY CT)))
                     (EQUAL (CADDR (ARRY-STORE PT)) (CADDDR (ARRY CT)))
                     (EQUAL (CADDDR (ARRY-STORE PT)) (CADDR (ARRY CT)))
                     (EQUAL (CADDDR (ARRY-STORE PT)) (CADDDR (ARRY CT))))
                 (NOT (EQUAL (ARRY-STORE PT) (ARRY CT)))
                 (NOT (EQUATE (CDDR (ARRY-STORE PT)) (CDDR (ARRY CT)))))
             (SETQ LIST1 (CONS (ARRY CT) LIST1))
             (GO LOOP2))
           (T (GO LOOP)))
     LOOP2
     (SETQ P1 (CAAR LIST1))
     (SETQ P2 (CADAR LIST1))
     (SETQ P3 (CADDAR LIST1))
     (SETQ P4 (CAR (CDDDAR LIST1)))
     (SETQ P5 (CAADR LIST1))
     (SETQ P6 (CADADR LIST1))
```

```
        (SETQ P7 (CAR (CDDADR LIST1)))
        (SETQ P8 (CADDDR (CADR LIST1)))
        (COND ((FIND-MATCH P1 P2 P3 P4 P5 P6 P7 P8 NPAIRS)
               (REMOVELST LIST1 NPAIRS)
               (SETQ MLIST (CONS LIST1 MLIST))
               (COND ((MATCH-LINE (ADD1 PT) NPAIRS) (GO LOOP3))
                     (T (RESET NPAIRS) (SETQ MLIST (CDR MLIST))
                        (GO LOOP))))
              (T (GO LOOP)))
    LOOP3
        (SETQ P1 (CAAAR MLIST))
        (SETQ P2 (CADAAR MLIST))
        (SETQ P3 (CADDR (CAAR MLIST)))
        (SETQ P4 (CADDDR (CAAR MLIST)))
        (SETQ P5 (CAR (CAADR MLIST)))
        (SETQ P6 (CADR (CAADR MLIST)))
        (SETQ P7 (CADDR (CAADR MLIST)))
        (SETQ P8 (CADDDR (CAADR MLIST)))
        (COND ((FIND-MATCH P1 P2 P3 P4 P5 P6 P7 P8 NPAIRS)
               (PRINT 'THE-END) (PRINT MLIST) (RETURN T)))
        (SETQ P5 (CAR (CADADR MLIST)))
        (SETQ P6 (CADR (CADADR MLIST)))
        (SETQ P7 (CADDR (CADADR MLIST)))
        (SETQ P8 (CADDDR (CADADR MLIST)))
        (COND ((FIND-MATCH P1 P2 P3 P4 P5 P6 P7 P8 NPAIRS)
               (PRINT 'THE-END) (PRINT MLIST) (RETURN T))
              (T (RESET NPAIRS) (SETQ MLIST (CDR MLIST)) (RETURN NIL)))
    ERROR
        (RETURN NIL)
))
;************ FUNCTION FIND ***************************
(DEFUN FIND (LST1 LST2 KNT NPAIRS)
    (PROG ()
      (COND ((> KNT NPAIRS) (RETURN NIL)))
      (COND ((AND (EQUATE (LIST (CAR (ARRY KNT)) (CADR (ARRY KNT)))
                          LST1)
                  (EQUATE (LIST (CADDR (ARRY KNT))
                                (CADDDR (ARRY KNT))) LST2))
             (SETQ LST (LIST T (CAR LST1) (CADR LST1) (CAR LST2)
                (CADR LST2))) (ARRY KNT NIL) (RETURN T))
            (T (FIND LST1 LST2 (ADD1 KNT) NPAIRS)))))
;
;************ FUNCTION ZERO-OUT ***********************
(DEFUN ZERO-OUT (ARRY-STORE KT)
      (COND ((= KT 100) T)
            (T (ARRY-STORE KT NIL)
               (ZERO-OUT ARRY-STORE (ADD1 KT)))))
;
;
;************ FUNCTION FIND-MATCH ***************************
(DEFUN FIND-MATCH (P1 P2 P3 P4 P5 P6 P7 P8 NPAIRS)
    (PROG ()
    (SETQ CT 0)
    (SETQ LST NIL)
    (COND ((AND (= P1 P5) (= P3 P7)) (FIND (LIST P2 P6)
              (LIST P4 P8) CT NPAIRS) (GO END))
          ((AND (= P1 P5) (= P3 P8)) (FIND (LIST P2 P6) (LIST P4 P7)
              CT NPAIRS) (GO END))
          ((AND (= P1 P6) (= P3 P7)) (FIND (LIST P2 P5) (LIST P4 P8)
              CT NPAIRS) (GO END))
          ((AND (= P2 P6) (= P3 P8)) (FIND (LIST P2 P5) (LIST P4 P7)
              CT NPAIRS) (GO END))
```

```
                ((AND (= P1 P5) (= P4 P7)) (FIND (LIST P2 P6) (LIST P3 P8)
                      CT NPAIRS) (GO END))
                ((AND (= P1 P5) (= P4 P8)) (FIND (LIST P2 P6) (LIST P3 P7)
                      CT NPAIRS) (GO END))
                ((AND (= P1 P6) (= P4 P7)) (FIND (LIST P2 P5) (LIST P3 P8)
                      CT NPAIRS) (GO END))
                ((AND (= P1 P6) (= P4 P8)) (FIND (LIST P2 P5) (LIST P3 P7)
                      CT NPAIRS) (GO END))
                ((AND (= P1 P6) (= P3 P8)) (FIND (LIST P2 P5) (LIST P4 P7)
                      CT NPAIRS) (GO END))
                ((AND (= P2 P5) (= P3 P7)) (FIND (LIST P1 P6) (LIST P4 P8)
                      CT NPAIRS) (GO END))
                ((AND (= P2 P5) (= P3 P8)) (FIND (LIST P1 P6) (LIST P4 P7)
                      CT NPAIRS) (GO END))
                ((AND (= P2 P6) (= P3 P7)) (FIND (LIST P1 P5) (LIST P4 P8)
                      CT NPAIRS) (GO END))
                ((AND (= P2 P6) (= P3 P8)) (FIND (LIST P1 P5) (LIST P4 P7)
                      CT NPAIRS) (GO END))
                ((AND (= P2 P5) (= P4 P7)) (FIND (LIST P1 P6) (LIST P3 P8)
                      CT NPAIRS) (GO END))
                ((AND (= P2 P5) (= P4 P8)) (FIND (LIST P1 P6) (LIST P3 P7)
                      CT NPAIRS) (GO END))
                ((AND (= P2 P6) (= P4 P7)) (FIND (LIST P1 P5) (LIST P3 P8)
                      CT NPAIRS) (GO END))
                ((AND (= P2 P6) (= P4 P8)) (FIND (LIST P1 P5) (LIST P3 P7)
                      CT NPAIRS) (GO END))
                (T (GO ERROR)))
        END
        (COND ((EQUAL (CAR LST) T) (SETQ LIST1 (CONS (CDR LST) LIST1))
                 (RETURN T))
              (T (RETURN NIL)))
        ERROR
        (RETURN NIL)))
;
;************** FUNCTION RESET ***********************************
(DEFUN RESET (NPAIRS)
     (PROG (CNT)
     (SETQ CNT -1)
     LOOP
        (COND ((EQUAL CNT NPAIRS) (RETURN T))
              (T (SETQ CNT (ADD1 CNT))))
        (ARRY CNT (FILE CNT))
        (GO LOOP)))
;
;******** MAIN PROGRAM ***********
(DEFUN MAIN (NPAIRS)
     (PROG (COUNTER)
     (SETQ COUNTER -1)
     LOOP
       (PRINT COUNTER)
       (COND ((EQUAL COUNTER NPAIRS) (RETURN NIL))
             (T (SETQ COUNTER (ADD1 COUNTER))))
       (RESET NPAIRS)
       (ZERO-OUT ARRY-STORE 0)
       (SETQ MLIST NIL)
       (ARRY-STORE 0 (ARRY COUNTER))
       (ARRY-STORE 1 (ARRY-STORE 0))
       (COND ((EQUAL (ARRY-STORE 1) NIL) (GO LOOP)))
       (SETQ MLIST1 (LIST (ARRY-STORE 0)))
       (COND ((NOT (MATCH-LINE 0 NPAIRS)) (GO LOOP)))
     FINISH
       (PRINT 'FINISHED!!!!!!!)
```

```
     (PRINT MLIST)
))
;******* MAIN PROGRAM ****************
;*********************** LISP-CODE  DEVELOPMENT ****************
;******* SET ARRAYS AND CONSTANTS ****
(SETQ ARRY (MAKE-ARRAY '(2500)))
(SETQ ARRY-STORE (MAKE-ARRAY '(2500)))
(SETQ FILE (MAKE-ARRAY '(2500)))
;
;******* READ IN INITIAL PING ********
(SETQ FILE1 (OPEN_READ "DOUG'S HARD DISK:LISP-FOLDER:DATAX"))
(SETQ NPAIRS (READ FILE1))
(READ-PING FILE NPAIRS)
(MAIN NPAIRS)
```

CFGIF:

| | A | B |
|---|---|---|
| 1 | | IF - ROUTINE TO FIND CONGRUENT GEOMETRICAL FIGURES FROM |
| 2 | | =RESULT(1) |
| 3 | | =ARGUMENT("NPOINTS") |
| 4 | | =SET.VALUE(NLML,NLMLO) |
| 5 | | =SET.VALUE(reset,0) |
| 6 | reset | =reset+1 |
| 7 | | =SET.VALUE(INDEX(LRMSTEP,reset),0) |
| 8 | | =IF(reset<NLML,GOTO(reset)) |
| 9 | | |
| 10 | | |
| 11 | START | =SET.VALUE(NCGF,1) |
| 12 | | =SET.VALUE(INDEX(CGFS,NCGF),INDEX(LMLSA,NLML)) |
| 13 | | =SET.VALUE(INDEX(CGFM,NCGF),INDEX(LMLMA,NLML)) |
| 14 | | |
| 15 | | =SET.VALUE(NCGF,NCGF+1) |
| 16 | | =SET.VALUE(INDEX(CGFS,NCGF),INDEX(LMLSB,NLML)) |
| 17 | | =SET.VALUE(INDEX(CGFM,NCGF),INDEX(LMLMB,NLML)) |
| 18 | | |
| 19 | | =SET.VALUE(NLML,NLML-1) |
| 20 | | =SET.VALUE(STEP,1) |
| 21 | | =IF(NLML<NPOINTS,GOTO(EXIT)) |
| 22 | SEARCH | =SET.VALUE(NADD,0) |
| 23 | | =SET.VALUE(NSC,0) |
| 24 | | =SET.VALUE(NSCL,1) |
| 25 | NSC | =NSC+1 |
| 26 | | =SET.VALUE(NSCcopy,NSC) |
| 27 | | =IF(INDEX(LRMSTEP,NSC)>0,GOTO(NSC)) |
| 28 | TSA | =INDEX(LMLSA,NSC) |
| 29 | TSB | =INDEX(LMLSB,NSC) |
| 30 | TMA | =INDEX(LMLMA,NSC) |
| 31 | TMB | =INDEX(LMLMB,NSC) |
| 32 | | =SET.VALUE(NSCA,0) |
| 33 | NSCA | =NSCA+1 |
| 34 | PS | =INDEX(CGFS,NSCA) |
| 35 | PM | =INDEX(CGFM,NSCA) |
| 36 | | =IF(AND(OR(TSA=PS,TSB=PS),OR(TMA=PM,TMB=PM)),GOTO(FOUND1)) |
| 37 | CONTIN1 | =IF(NSCA<NCGF,GOTO(NSCA)) |
| 38 | | =IF(NSC<NLML,GOTO(NSC)) |
| 39 | NFOUND | =IF(OR(NADD=0,NLML-NSCL<NPOINTS-1),GOTO(BACKTRACK)) |
| 40 | | =SET.VALUE(NSCR,NSCL) |
| 41 | NSCR | =NSCR+1 |
| 42 | | =IF(INDEX(LRMSTEP,NSCR)>=STEP,SET.VALUE(INDEX(LRMSTEP,NSCR),0)) |
| 43 | | =IF(NSCR<NLML,GOTO(NSCR)) |
| 44 | | =SET.VALUE(NADD,0) |
| 45 | | =SET.VALUE(NSC,NSCL) |
| 46 | | =GOTO(NSC) |
| 47 | BACKTRACK | =SET.VALUE(NADD,0) |
| 48 | | =SET.VALUE(NSCB,0) |
| 49 | NSCB | =NSCB+1 |
| 50 | | =IF(INDEX(LRMSTEP,NSCB)>=STEP,SET.VALUE(INDEX(LRMSTEP,NSCB),0)) |
| 51 | | =IF(NSCB<NLML,GOTO(NSCB)) |
| 52 | | =SET.VALUE(NCGF,STEP) |
| 53 | | =SET.VALUE(STEP,STEP-1) |
| 54 | | =IF(STEP<1,GOTO(START)) |
| 55 | | =GOTO(SEARCH) |
| 56 | FOUND1 | =IF(NADD=0,GOTO(NSCL)) |
| 57 | | =IF(AND(OR(TSA=TPS,TSB=TPS),OR(TMA=TPM,TMB=TPM)),GOTO(NADD)) |
| 58 | | =GOTO(CONTIN1) |
| 59 | NSCL | =NSC |
| 60 | TPS | =IF(PS=TSA,TSB,TSA) |
| 61 | TPM | =IF(PM=TMA,TMB,TMA) |
| 62 | NADD | =NADD+1 |
| 63 | | =SET.VALUE(INDEX(LRMSTEP,NSC),STEP) |
| 64 | | =IF(NADD<NCGF,GOTO(NSC)) |
| 65 | STEP | =STEP+1 |
| 66 | | =SET.VALUE(NCGF,STEP+1) |
| 67 | | =SET.VALUE(INDEX(CGFS,NCGF),TPS) |
| 68 | | =SET.VALUE(INDEX(CGFM,NCGF),TPM) |
| 69 | | =IF(NCGF<NPOINTS,GOTO(SEARCH)) |
| 70 | EXIT | =RETURN(NCGF) |

|   | C |
|---|---|
| 1 | LIST OF MATCHED LINES |
| 2 | NLMLO |
| 3 | 10 |
| 4 | restore NLML |
| 5 | reset removal flags |
| 6 | reset loop |
| 7 | |
| 8 | end of loop |
| 9 | |
| 10 | |
| 11 | start a CGF |
| 12 | |
| 13 | |
| 14 | |
| 15 | |
| 16 | |
| 17 | |
| 18 | |
| 19 | reduce LML |
| 20 | set step to 1 |
| 21 | |
| 22 | set addition ML count to 0 |
| 23 | zero LML counter |
| 24 | zero LML marker |
| 25 | LML search loop |
| 26 | |
| 27 | ignore removed entries |
| 28 | |
| 29 | |
| 30 | |
| 31 | |
| 32 | zero CGF counter |
| 33 | CGF search loop |
| 34 | |
| 35 | |
| 36 | TEST IF ONE END MATCHES |
| 37 | end of CGF search loop |
| 38 | end of LML search loop |
| 39 | not found routine |
| 40 | |
| 41 | loop to restore LML |
| 42 | restore some ML to LML |
| 43 | end of loop to restore LML |
| 44 | reset ML count |
| 45 | resume search |
| 46 | |
| 47 | |
| 48 | backtrack routine |
| 49 | loop to restore LML |
| 50 | restore all ML at STEP and higher |
| 51 | end of loop |
| 52 | reduce CGF |
| 53 | reduce STEP |
| 54 | |
| 55 | |
| 56 | |
| 57 | |
| 58 | |
| 59 | first ML, save NSC for later resumption |
| 60 | set test point pair |
| 61 | |
| 62 | increment additional ML count |
| 63 | mark for temporary removal from LML |
| 64 | continue search if CGF incomplete |
| 65 | advance to nest step |
| 66 | increment CGF count |
| 67 | enter new points into CGF |
| 68 | |
| 69 | |
| 70 | EXIT if CGF contains required points |

| | D | E | F | G | H | I | J | K |
|---|---|---|---|---|---|---|---|---|
| 1 | LML | LIST OF | MATCHED | LINES | | CGF | CONGRUENT | |
| 2 | NLML | NSCGGFW | | | REMOVE | NCGF | GEOMETRICAL | |
| 3 | 5 | 5 | | | FLAG | 4 | FIGURE | |
| 4 | LMLSA | LMLSB | LMLMA | LMLMB | LRMSTEP | CGFSTEP | CGFSA | CGFMA |
| 5 | 1 | 2 | 5 | 6 | 2 | 0 | 3 | 7 |
| 6 | 1 | 3 | 5 | 7 | 1 | 0 | 4 | 8 |
| 7 | 1 | 4 | 5 | 8 | 1 | | 1 | 5 |
| 8 | 2 | 3 | 6 | 7 | 2 | | 2 | 6 |
| 9 | 2 | 4 | 6 | 8 | 2 | | | |
| 10 | 3 | 4 | 7 | 8 | 0 | | | |
| 11 | 1 | 5 | 5 | 1 | 0 | | | |
| 12 | 1 | 6 | 5 | 2 | 0 | | | |
| 13 | 5 | 6 | 1 | 2 | 2 | | | |
| 14 | 1 | 7 | 5 | 6 | 0 | | | |

|   | A | C | D | E | F | G | H | I | J | K |
|---|---|---|---|---|---|---|---|---|---|---|
| 1 |   |   | TWO-D | TRACKING |   |   |   |   |   |   |
| 2 |   | WITH | 4 POINT | CONGRUE | NT | FIGURE |   |   |   |   |
| 3 | TEST |   |   |   |   |   |   |   |   |   |
| 4 | DATA | SCENE | Matched | polygon | vertice | a,b,c,d |   |   |   |   |
| 5 | count | (Ping) | Xa | Ya | Xb | Yb | Xc | Yc | Xd | Yd |
| 6 | 1 | 1 | 0 | 9 | 9 | 9 | 9 | 0 | 3 | 4 |
| 7 | =A6+1 | 2 | 9 | 13 | 9 | 4 | 0 | 4 | 4 | 10 |
| 8 |   | 3 | 9 | 13 | 9 | 4 | 0 | 4 | 4 | 10 |
| 9 | =A7+1 | 4 | =D8 | =E8+1 | =F8 | =G8+1 | =H8 | =I8+1 | =J8 | =K8+1 |
| 10 |   |   |   |   |   |   |   |   |   |   |
| 11 | SCNAR |   |   |   |   |   |   |   |   |   |
| 12 | DATA |   | Matched | polygon | vertice | abcd |   |   |   |   |
| 13 | count | Ping | Xa | Ya | Xb | Yb | Xc | Yc | Xd | Yd |
| 14 | 1 | 1 | 9.79 | -260.08 | -251.5 | -432.83 | -72.65 | -453.05 | -249.56 | -426.38 |
| 15 | 2 | 2 | 14.12 | -254.54 | -251.99 | -427.22 | -74.55 | -447.03 | -251.31 | -419.93 |
| 16 |   | 2 | -251.98 | -427.22 | -198.43 | -319.72 | -201.3 | -326.9 | -74.55 | -447.03 |
| 17 | =A15+1 | =C15+1 | -255.62 | -419.14 | -199.62 | -313.39 | -203.34 | -319.9 | -77.61 | -439.74 |
| 18 |   | =C16+1 | -255.62 | -419.14 | -199.62 | -313.39 | -77.61 | -439.74 | -252.67 | -412.43 |
| 19 | =A17+1 | =C17+1 | -260.61 | -410.55 | -206.69 | -303.07 | -80.89 | -433.24 | -256.79 | -404.27 |
| 20 |   | =C18+1 | -80.89 | -433.24 | -256.79 | -404.27 | -260.61 | -410.55 | -59.34 | -565.08 |
| 21 | =A19+1 | =C19+1 | -84.85 | -426.12 | -260.68 | -396.28 | -260.63 | -404.2 | -57 | -559.2 |
| 22 |   | =C20+1 | -84.55 | -426.12 | -260.68 | -396.28 | -260.63 | -404.2 | -57 | -559.2 |
| 23 | =A21+1 | =C21+1 | -80.8 | -420.8 | -254.32 | -394.87 | -259.68 | -399.76 | -58.59 | -556.44 |
| 24 |   | =C22+1 | -80.8 | -420.9 | -254.32 | -394.87 | -58.59 | -556.44 | -204.21 | -595.56 |
| 25 | =A23+1 | =C23+1 | -82.16 | -415.19 | -257.24 | -387.08 | -54.04 | -549.74 | -202.88 | -590.27 |
| 26 |   | =C24+1 | -200.7 | -290.47 | -82.16 | -415.18 | -54.04 | -549.74 | -202.88 | -590.27 |
| 27 | =A25+1 | =C25+1 | -208.85 | -288.56 | -80.21 | -409.29 | -49.98 | -542.13 | -201.68 | -585.26 |
| 28 |   | =C26+1 | -80.21 | -409.29 | -260.02 | -389.33 | -49.98 | -542.13 | -201.68 | -585.26 |
| 29 | =A27+1 | =C27+1 | -82.73 | -403.4 | -262.2 | -382.11 | -58.52 | -538.64 | -203.55 | -578.85 |
| 30 |   | =C28+1 | -82.73 | -403.4 | -262.2 | -382.11 | -58.52 | -538.64 | -203.55 | -578.85 |
| 31 | =A29+1 | =C29+1 | -87.68 | -395.92 | -263.81 | -375.75 | -61.98 | -531.69 | -208.7 | -570.73 |
| 32 |   | =C30+1 | -87.68 | -395.92 | -61.98 | -531.69 | -208.7 | -570.73 | -212.26 | -573.89 |
| 33 | =A31+1 | =C31+1 | -87.65 | -390.6 | -66.07 | -524.4 | -212.2 | -564.03 | -217.19 | -566.95 |

|   | L | M | N | O | P | Q |
|---|---|---|---|---|---|---|
| 1 |   |   |   |   |   |   |
| 2 |   |   |   |   |   |   |
| 3 | Reference |   |   |   |   |   |
| 4 | position | and | heading |   |   |   |
| 5 | X - m | Y - m | ø - deg | Sigma X | Sigma Y | Sigma ø |
| 6 | 0 | 0 | 0 | =L6 | =M6 | =N6 |
| 7 | 13 | 0 | 90 | =O6+L7 | =P6+M7 | =Q6+N7 |
| 8 | 13 | 0 | 90 | =O7 | =P7 | =Q7 |
| 9 | 14 | 0 | 90 | =O8+L9 | =P8+M9 | =Q8+N9 |
| 10 |   |   | Average | =O9/A9 | =P9/A9 | =Q9/A9 |
| 11 | Reference |   |   |   |   |   |
| 12 | position | and | heading |   |   |   |
| 13 | X - m | Y - m | ø - deg | Sigma X | Sigma Y | Sigma ø |
| 14 | 214.6 | 191.9 | 0 | =L14 | =M14 | =N14 |
| 15 | 214.4 | 196.3 |   | =O14+L15 | =P14+M15 | =Q14+N15 |
| 16 | =L15 | =M15 |   | =O15 | =P15 | =Q15 |
| 17 | 213.4 | 180.2 |   | =O16+L17 | =P16+M17 | =Q16+N17 |
| 18 | =L17 | =M17 |   | =O17 | =P17 | =Q17 |
| 19 | 213.4 | 174.1 |   | =O18+L19 | =P18+M19 | =Q18+N19 |
| 20 | =L19 | =M19 |   | =O19 | =P19 | =Q19 |
| 21 | 212.9 | 167.8 |   | =O20+L21 | =P20+M21 | =Q20+N21 |
| 22 | =L21 | =M21 |   | =O21 | =P21 | =Q21 |
| 23 | 215.6 | 161.3 |   | =O22+L23 | =P22+M23 | =Q22+N23 |
| 24 | =L23 | =M23 |   | =O23 | =P23 | =Q23 |
| 25 | 217.4 | 154.7 |   | =O24+L25 | =P24+M25 | =Q24+N25 |
| 26 | =L25 | =M25 |   | =O25 | =P25 | =Q25 |
| 27 | 217 | 149.3 |   | =O26+L27 | =P26+M27 | =Q26+N27 |
| 28 | =L27 | =M27 |   | =O27 | =P27 | =Q27 |
| 29 | 217.6 | 143.2 |   | =O28+L29 | =P28+M29 | =Q28+N29 |
| 30 | =L29 | =M29 |   | =O29 | =P29 | =Q29 |
| 31 | 215.1 | 137.4 |   | =O30+L31 | =P30+M31 | =Q30+N31 |
| 32 | =L31 | =M31 |   | =O31 | =P31 | =Q31 |
| 33 | 218.1 | 131.2 |   | =O32+L33 | =P32+M33 | =Q32+N33 |

|    | R                | S                | T         | U        | V         | W         |
|----|------------------|------------------|-----------|----------|-----------|-----------|
| 1  |                  |                  |           |          |           |           |
| 2  | SENSOR           |                  |           |          |           |           |
| 3  | mapped           |                  |           |          |           |           |
| 4  | position         | and              | headin    |          |           |           |
| 5  | X  -  m          | Y  -  m          | ø  -      | Sigma X  | Sigma Y   | Sigma ø   |
| 6  | 0                | 0                | 90        | =R6      | =S6       | =T6       |
| 7  | =R6+AJ7-AJ6      | =S6+AK7-AK6      | =AL7      | =U6+R7   | =V6-S7    | =W6+T7    |
| 8  | =R7              | =S7              | =AL8      | =U7      | =V7       | =W7       |
| 9  | =R8-AJ9-AJ8      | =S8+AK9-AK8      | =AL9      | =U8+R9   | =V8+S9    | =W8+T9    |
| 10 |                  |                  | Averag    | =U9/A9   | =V9/A9    | =W9/A9    |
| 11 | mapped           |                  |           |          |           |           |
| 12 | position         | and              | headin    |          |           |           |
| 13 | X  -  m          | Y  -  m          | ø  -      | Sigma X  | Sigma Y   | Sigma ø   |
| 14 | 211.96           | 193.75           | -6        | =R14     | =S14      | =T14      |
| 15 | =R14+AJ15-AJ14   | =S14+AK15-AK14   | =AL15     | =U14+R15 | =V14+S15  | =W14+T15  |
| 16 | =R15             | =S15             | =AL16     | =U15     | =V15      | =W15      |
| 17 | =R16+AJ17-AJ16   | =S16+AK17-AK16   | =AL17     | =U16+R17 | =V16+S17  | =W16+T17  |
| 18 | =R17             | =S17             | =AL18     | =U17     | =V17      | =W17      |
| 19 | =R18+AJ19-AJ18   | =S18+AK19-AK18   | =AL19     | =U18+R19 | =V18+S19  | =W18+T19  |
| 20 | =R19             | =S19             | =AL20     | =U19     | =V19      | =W19      |
| 21 | =R20+AJ21-AJ20   | =S20+AK21-AK20   | =AL21     | =U20+R21 | =V20+S21  | =W20+T21  |
| 22 | =R21             | =S21             | =AL22     | =U21     | =V21      | =W21      |
| 23 | =R22+AJ23-AJ22   | =S22+AK23-AK22   | =AL23     | =U22+R23 | =V22+S23  | =W22+T23  |
| 24 | =R23             | =S23             | =AL24     | =U23     | =V23      | =W23      |
| 25 | =R24+AJ25-AJ24   | =S24+AK25-AK24   | =AL25     | =U24+R25 | =V24+S25  | =W24+T25  |
| 26 | =R25             | =S25             | =AL26     | =U25     | =V25      | =W25      |
| 27 | =R26+AJ27-AJ26   | =S26+AK27-AK26   | =AL27     | =U26+R27 | =V26+S27  | =W26+T27  |
| 28 | =R27             | =S27             | =AL28     | =U27     | =V27      | =W27      |
| 29 | =R28+AJ29-AJ28   | =S28+AK29-AK28   | =AL29     | =U28+R29 | =V28+S29  | =W28+T29  |
| 30 | =R29             | =S29             | =AL30     | =U29     | =V29      | =W29      |
| 31 | =R30+AJ31-AJ30   | =S30+AK31-AK30   | =AL31     | =U30+R31 | =V30+S31  | =W30+T31  |
| 32 | =R31             | =S31             | =AL32     | =U31     | =V31      | =W31      |
| 33 | =R32+AJ33-AJ32   | =S32+AK33-AK32   | =AL33     | =U32+R33 | =V32+S33  | =W32+T33  |

|    | X            | Y            | Z           |
|----|--------------|--------------|-------------|
| 1  |              |              |             |
| 2  | SENSOR       |              |             |
| 3  | displacement |              |             |
| 4  | position     | and          | Rotation    |
| 5  | ΔX - m       | ΔY - m       | Δø - deg.   |
| 6  |              |              |             |
| 7  | =R7-R6       | =S7-S6       | =T7-T6      |
| 8  |              |              |             |
| 9  | =R9-R8       | =S9-S8       | =T9-T8      |
| 10 |              |              |             |
| 11 |              |              |             |
| 12 |              |              | Rotation    |
| 13 | ΔX - m       | ΔY - m       | Δø - deg.   |
| 14 |              |              |             |
| 15 | =R15-R14     | =S15-S14     | =T15-T14    |
| 16 |              |              |             |
| 17 | =R17-R16     | =S17-S16     | =T17-T16    |
| 18 |              |              |             |
| 19 | =R19-R18     | =S19-S18     | =T19-T18    |
| 20 |              |              |             |
| 21 | =R21-R20     | =S21-S20     | =T21-T20    |
| 22 |              |              |             |
| 23 | =R23-R22     | =S23-S22     | =T23-T22    |
| 24 |              |              |             |
| 25 | =R25-R24     | =S25-S24     | =T25-T24    |
| 26 |              |              |             |
| 27 | =R27-R26     | =S27-S26     | =T27-T26    |
| 28 |              |              |             |
| 29 | =R29-R28     | =S29-S28     | =T29-T28    |
| 30 |              |              |             |
| 31 | =R31-R30     | =S31-S30     | =T31-T30    |
| 32 |              |              |             |
| 33 | =R33-R32     | =S33-S32     | =T33-T32    |

| | AA | AB | AC |
|---|---|---|---|
| 1 | | | |
| 2 | POLYGON | | |
| 3 | ROTATION | CALCULATIONS | |
| 4 | average position | of quadrilateral | Range |
| 5 | X1 | Y1 | R1 |
| 6 | =(D6+J6+H6+F6)/4 | =(E6+K6+I6+G6)/4 | =SQRT((AA6*AA6)+(AB6*AB6)) |
| 7 | =(D7+J7+H7+F7)/4 | =(E7+K7+I7+G7)/4 | =SQRT((AA7*AA7)+(AB7*AB7)) |
| 8 | =(D8+J8+H8+F8)/4 | =(E8+K8+I8+G8)/4 | =SQRT((AA8*AA8)+(AB8*AB8)) |
| 9 | =(D9+J9+H9+F9)/4 | =(E9+K9+I9+G9)/4 | =SQRT((AA9*AA9)+(AB9*AB9)) |
| 10 | | | |
| 11 | ROTATION CALCULATION | | |
| 12 | average position | of quadrilateral | Range |
| 13 | X1 | Y1 | R1 |
| 14 | =(D14+J14+H14+F14)/4 | =(E14+K14+I14+G14)/4 | =SQRT((AA14*AA14)+(AB14*AB14)) |
| 15 | =(D15+J15+H15+F15)/4 | =(E15+K15+I15+G15)/4 | =SQRT((AA15*AA15)+(AB15*AB15)) |
| 16 | =(D16+J16+H16+F16)/4 | =(E16+K16+I16+G16)/4 | =SQRT((AA16*AA16)+(AB16*AB16)) |
| 17 | =(D17+J17+H17+F17)/4 | =(E17+K17+I17+G17)/4 | =SQRT((AA17*AA17)+(AB17*AB17)) |
| 18 | =(D18+J18+H18+F18)/4 | =(E18+K18+I18+G18)/4 | =SQRT((AA18*AA18)+(AB18*AB18)) |
| 19 | =(D19+J19+H19+F19)/4 | =(E19+K19+I19+G19)/4 | =SQRT((AA19*AA19)+(AB19*AB19)) |
| 20 | =(D20+J20+H20+F20)/4 | =(E20+K20+I20+G20)/4 | =SQRT((AA20*AA20)+(AB20*AB20)) |
| 21 | =(D21+J21+H21+F21)/4 | =(E21+K21+I21+G21)/4 | =SQRT((AA21*AA21)+(AB21*AB21)) |
| 22 | =(D22+J22+H22+F22)/4 | =(E22+K22+I22+G22)/4 | =SQRT((AA22*AA22)+(AB22*AB22)) |
| 23 | =(D23+J23+H23+F23)/4 | =(E23+K23+I23+G23)/4 | =SQRT((AA23*AA23)+(AB23*AB23)) |
| 24 | =(D24+J24+H24+F24)/4 | =(E24+K24+I24+G24)/4 | =SQRT((AA24*AA24)+(AB24*AB24)) |
| 25 | =(D25+J25+H25+F25)/4 | =(E25+K25+I25+G25)/4 | =SQRT((AA25*AA25)+(AB25*AB25)) |
| 26 | =(D26+J26+H26+F26)/4 | =(E26+K26+I26+G26)/4 | =SQRT((AA26*AA26)+(AB26*AB26)) |
| 27 | =(D27+J27+H27+F27)/4 | =(E27+K27+I27+G27)/4 | =SQRT((AA27*AA27)+(AB27*AB27)) |
| 28 | =(D28+J28+H28+F28)/4 | =(E28+K28+I28+G28)/4 | =SQRT((AA28*AA28)+(AB28*AB28)) |
| 29 | =(D29+J29+H29+F29)/4 | =(E29+K29+I29+G29)/4 | =SQRT((AA29*AA29)+(AB29*AB29)) |
| 30 | =(D30+J30+H30+F30)/4 | =(E30+K30+I30+G30)/4 | =SQRT((AA30*AA30)+(AB30*AB30)) |
| 31 | =(D31+J31+H31+F31)/4 | =(E31+K31+I31+G31)/4 | =SQRT((AA31*AA31)+(AB31*AB31)) |
| 32 | =(D32+J32+H32+F32)/4 | =(E32+K32+I32+G32)/4 | =SQRT((AA32*AA32)+(AB32*AB32)) |
| 33 | =(D33+J33+H33+F33)/4 | =(E33+K33+I33+G33)/4 | =SQRT((AA33*AA33)+(AB33*AB33)) |

| | AD | AE | AF | AG |
|---|---|---|---|---|
| 1 | | | | |
| 2 | POLYGON | | | |
| 3 | | | | |
| 4 | Unit vector | | Rotation tangent | |
| 5 | X1n | Y1n | C1rot | S1rot |
| 6 | =AA6/AC6 | =AB6/AC6 | | |
| 7 | =AA7/AC7 | =AB7/AC7 | =AD6*AD7+AE6*AE7 | =AD6*AE7-AE6*AD7 |
| 8 | =AA8/AC8 | =AB8/AC8 | | |
| 9 | =AA9/AC9 | =AB9/AC9 | =AD8*AD9+AE8*AE9 | =AD8*AE9-AE8*AD9 |
| 10 | | | | |
| 11 | | | | |
| 12 | Unit vector | | Rotation tangent | |
| 13 | X1n | Y1n | C1rot | S1rot |
| 14 | =AA14/AC14 | =AB14/AC14 | | |
| 15 | =AA15/AC15 | =AB15/AC15 | =AD14*AD15+AE14*AE15 | =AD14*AE15-AE14*AD15 |
| 16 | =AA16/AC16 | =AB16/AC16 | | |
| 17 | =AA17/AC17 | =AB17/AC17 | =AD16*AD17+AE16*AE17 | =AD16*AE17-AE16*AD17 |
| 18 | =AA18/AC18 | =AB18/AC18 | | |
| 19 | =AA19/AC19 | =AB19/AC19 | =AD18*AD19+AE18*AE19 | =AD18*AE19-AE18*AD19 |
| 20 | =AA20/AC20 | =AB20/AC20 | | |
| 21 | =AA21/AC21 | =AB21/AC21 | =AD20*AD21+AE20*AE21 | =AD20*AE21-AE20*AD21 |
| 22 | =AA22/AC22 | =AB22/AC22 | | |
| 23 | =AA23/AC23 | =AB23/AC23 | =AD22*AD23+AE22*AE23 | =AD22*AE23-AE22*AD23 |
| 24 | =AA24/AC24 | =AB24/AC24 | | |
| 25 | =AA25/AC25 | =AB25/AC25 | =AD24*AD25+AE24*AE25 | =AD24*AE25-AE24*AD25 |
| 26 | =AA26/AC26 | =AB26/AC26 | | |
| 27 | =AA27/AC27 | =AB27/AC27 | =AD26*AD27+AE26*AE27 | =AD26*AE27-AE26*AD27 |
| 28 | =AA28/AC28 | =AB28/AC28 | | |
| 29 | =AA29/AC29 | =AB29/AC29 | =AD28*AD29+AE28*AE29 | =AD28*AE29-AE28*AD29 |
| 30 | =AA30/AC30 | =AB30/AC30 | | |
| 31 | =AA31/AC31 | =AB31/AC31 | =AD30*AD31+AE30*AE31 | =AD30*AE31-AE30*AD31 |
| 32 | =AA32/AC32 | =AB32/AC32 | | |
| 33 | =AA33/AC33 | =AB33/AC33 | =AD32*AD33+AE32*AE33 | =AD32*AE33-AE32*AD33 |

|  | AH | AI |
|---|---|---|
| 1 |  |  |
| 2 |  |  |
| 3 | SENSOR HEADING |  |
| 4 | COSINE | SINE |
| 5 | Chead | Shead |
| 6 | =COS((T6)*ATAN(1)/45) | =SIN((T6)*ATAN(1)/45) |
| 7 | =AH6*BR7-BS7*AI6 | =-AH6*BS7+BR7*AI6 |
| 8 | =AH7 | =AI7 |
| 9 | =AH8*BR9+BS9*AI8 | =-AH8*BS9+BR9*AI8 |
| 10 |  |  |
| 11 |  |  |
| 12 | COSINE | SINE |
| 13 | Chead | Shead |
| 14 | =COS((T14)*ATAN(1)/45) | =SIN((T14)*ATAN(1)/45) |
| 15 | =AH14*BR15+BS15*AI14 | =-AH14*BS15+BR15*AI14 |
| 16 | =AH15 | =AI15 |
| 17 | =AH16*BR17+BS17*AI16 | =-AH16*BS17+BR17*AI16 |
| 18 | =AH17 | =AI17 |
| 19 | =AH18*BR19+BS19*AI18 | =-AH18*BS19+BR19*AI18 |
| 20 | =AH19 | =AI19 |
| 21 | =AH20*BR21+BS21*AI20 | =-AH20*BS21+BR21*AI20 |
| 22 | =AH21 | =AI21 |
| 23 | =AH22*BR23+BS23*AI22 | =-AH22*BS23+BR23*AI22 |
| 24 | =AH23 | =AI23 |
| 25 | =AH24*BR25+BS25*AI24 | =-AH24*BS25+BR25*AI24 |
| 26 | =AH25 | =AI25 |
| 27 | =AH26*BR27+BS27*AI26 | =-AH26*BS27+BR27*AI26 |
| 28 | =AH27 | =AI27 |
| 29 | =AH28*BR29+BS29*AI28 | =-AH28*BS29+BR29*AI28 |
| 30 | =AH29 | =AI29 |
| 31 | =AH30*BR31+BS31*AI30 | =-AH30*BS31+BR31*AI30 |
| 32 | =AH31 | =AI31 |
| 33 | =AH32*BR33+BS33*AI32 | =-AH32*BS33+BR33*AI32 |

|  | AJ | AK |
|---|---|---|
| 1 |  |  |
| 2 |  |  |
| 3 | RELATIVE TO AVERAGE POSITION | OF POLYGON |
| 4 | sensor position |  |
| 5 | Xsonar | Ysonar |
| 6 | =(-AA6)*AH6-(-AB6)*AI6 | =(-AA6)*AI6+(-AB6)*AH6 |
| 7 | =(-AA7)*AH7-(-AB7)*AI7 | =(-AA7)*AI7+(-AB7)*AH7 |
| 8 | =(-AA8)*AH8-(-AB8)*AI8 | =(-AA8)*AI8+(-AB8)*AH8 |
| 9 | =(-AA9)*AH9-(-AB9)*AI9 | =(-AA9)*AI9+(-AB9)*AH9 |
| 10 |  |  |
| 11 |  |  |
| 12 | sensor position |  |
| 13 | Xsonar | Ysonar |
| 14 | =(-AA14)*AH14-(-AB14)*AI14 | =(-AA14)*AI14+(-AB14)*AH14 |
| 15 | =(-AA15)*AH15-(-AB15)*AI15 | =(-AA15)*AI15+(-AB15)*AH15 |
| 16 | =(-AA16)*AH16-(-AB16)*AI16 | =(-AA16)*AI16+(-AB16)*AH16 |
| 17 | =(-AA17)*AH17-(-AB17)*AI17 | =(-AA17)*AI17+(-AB17)*AH17 |
| 18 | =(-AA18)*AH18-(-AB18)*AI18 | =(-AA18)*AI18+(-AB18)*AH18 |
| 19 | =(-AA19)*AH19-(-AB19)*AI19 | =(-AA19)*AI19+(-AB19)*AH19 |
| 20 | =(-AA20)*AH20-(-AB20)*AI20 | =(-AA20)*AI20+(-AB20)*AH20 |
| 21 | =(-AA21)*AH21-(-AB21)*AI21 | =(-AA21)*AI21+(-AB21)*AH21 |
| 22 | =(-AA22)*AH22-(-AB22)*AI22 | =(-AA22)*AI22+(-AB22)*AH22 |
| 23 | =(-AA23)*AH23-(-AB23)*AI23 | =(-AA23)*AI23+(-AB23)*AH23 |
| 24 | =(-AA24)*AH24-(-AB24)*AI24 | =(-AA24)*AI24+(-AB24)*AH24 |
| 25 | =(-AA25)*AH25-(-AB25)*AI25 | =(-AA25)*AI25+(-AB25)*AH25 |
| 26 | =(-AA26)*AH26-(-AB26)*AI26 | =(-AA26)*AI26+(-AB26)*AH26 |
| 27 | =(-AA27)*AH27-(-AB27)*AI27 | =(-AA27)*AI27+(-AB27)*AH27 |
| 28 | =(-AA28)*AH28-(-AB28)*AI28 | =(-AA28)*AI28+(-AB28)*AH28 |
| 29 | =(-AA29)*AH29-(-AB29)*AI29 | =(-AA29)*AI29+(-AB29)*AH29 |
| 30 | =(-AA30)*AH30-(-AB30)*AI30 | =(-AA30)*AI30+(-AB30)*AH30 |
| 31 | =(-AA31)*AH31-(-AB31)*AI31 | =(-AA31)*AI31+(-AB31)*AH31 |
| 32 | =(-AA32)*AH32-(-AB32)*AI32 | =(-AA32)*AI32+(-AB32)*AH32 |
| 33 | =(-AA33)*AH33-(-AB33)*AI33 | =(-AA33)*AI33+(-AB33)*AH33 |

|    | AL |
|----|-----|
| 1  |    |
| 2  |    |
| 3  | RELATIVE TO POLYGON |
| 4  | Sesnor heading |
| 5  | ø  deg |
| 6  | =45*ATAN2(AH6,AI6)/ATAN(1) |
| 7  | =45*ATAN2(AH7,AI7)/ATAN(1) |
| 8  | =45*ATAN2(AH8,AI8)/ATAN(1) |
| 9  | =45*ATAN2(AH9,AI9)/ATAN(1) |
| 10 |    |
| 11 |    |
| 12 | Sesnor heading |
| 13 | ø  deg |
| 14 | =45*ATAN2(AH14,AI14)/ATAN(1) |
| 15 | =45*ATAN2(AH15,AI15)/ATAN(1) |
| 16 | =45*ATAN2(AH16,AI16)/ATAN(1) |
| 17 | =45*ATAN2(AH17,AI17)/ATAN(1) |
| 18 | =45*ATAN2(AH18,AI18)/ATAN(1) |
| 19 | =45*ATAN2(AH19,AI19)/ATAN(1) |
| 20 | =45*ATAN2(AH20,AI20)/ATAN(1) |
| 21 | =45*ATAN2(AH21,AI21)/ATAN(1) |
| 22 | =45*ATAN2(AH22,AI22)/ATAN(1) |
| 23 | =45*ATAN2(AH23,AI23)/ATAN(1) |
| 24 | =45*ATAN2(AH24,AI24)/ATAN(1) |
| 25 | =45*ATAN2(AH25,AI25)/ATAN(1) |
| 26 | =45*ATAN2(AH26,AI26)/ATAN(1) |
| 27 | =45*ATAN2(AH27,AI27)/ATAN(1) |
| 28 | =45*ATAN2(AH28,AI28)/ATAN(1) |
| 29 | =45*ATAN2(AH29,AI29)/ATAN(1) |
| 30 | =45*ATAN2(AH30,AI30)/ATAN(1) |
| 31 | =45*ATAN2(AH31,AI31)/ATAN(1) |
| 32 | =45*ATAN2(AH32,AI32)/ATAN(1) |
| 33 | =45*ATAN2(AH33,AI33)/ATAN(1) |

|    | AM | AN | AO | AP | AQ |
|----|-----|-----|-----|-----|-----|
| 1  |    |    |    |    |    |
| 2  |    |    |    |    |    |
| 3  | VERTEX a |    |    |    |    |
| 4  | coordinates, | range | bearing and unit vectors | to vertex |    |
| 5  | Xam | Yam | Dam | Xamn | Yamn |
| 6  | =D6-AA6 | =E6-AB6 | =SQRT(AM6*AM6+AN6*AN6) | =AM6/AO6 | =AN6/AO6 |
| 7  | =D7-AA7 | =E7-AB7 | =SQRT(AM7*AM7+AN7*AN7) | =AM7/AO7 | =AN7/AO7 |
| 8  | =D8-AA8 | =E8-AB8 | =SQRT(AM8*AM8+AN8*AN8) | =AM8/AO8 | =AN8/AO8 |
| 9  | =D9-AA9 | =E9-AB9 | =SQRT(AM9*AM9+AN9*AN9) | =AM9/AO9 | =AN9/AO9 |
| 10 |    |    |    |    |    |
| 11 |    |    |    |    |    |
| 12 | coordinates, | range | bearing and unit vectors | to vertex | a |
| 13 | Xam | Yam | Dam | Xamn | Yamn |
| 14 | =D14-AA14 | =E14-AB14 | =SQRT(AM14*AM14+AN14*AN14) | =AM14/AO14 | =AN14/AO14 |
| 15 | =D15-AA15 | =E15-AB15 | =SQRT(AM15*AM15+AN15*AN15) | =AM15/AO15 | =AN15/AO15 |
| 16 | =D16-AA16 | =E16-AB16 | =SQRT(AM16*AM16+AN16*AN16) | =AM16/AO16 | =AN16/AO16 |
| 17 | =D17-AA17 | =E17-AB17 | =SQRT(AM17*AM17+AN17*AN17) | =AM17/AO17 | =AN17/AO17 |
| 18 | =D18-AA18 | =E18-AB18 | =SQRT(AM18*AM18+AN18*AN18) | =AM18/AO18 | =AN18/AO18 |
| 19 | =D19-AA19 | =E19-AB19 | =SQRT(AM19*AM19+AN19*AN19) | =AM19/AO19 | =AN19/AO19 |
| 20 | =D20-AA20 | =E20-AB20 | =SQRT(AM20*AM20+AN20*AN20) | =AM20/AO20 | =AN20/AO20 |
| 21 | =D21-AA21 | =E21-AB21 | =SQRT(AM21*AM21+AN21*AN21) | =AM21/AO21 | =AN21/AO21 |
| 22 | =D22-AA22 | =E22-AB22 | =SQRT(AM22*AM22+AN22*AN22) | =AM22/AO22 | =AN22/AO22 |
| 23 | =D23-AA23 | =E23-AB23 | =SQRT(AM23*AM23+AN23*AN23) | =AM23/AO23 | =AN23/AO23 |
| 24 | =D24-AA24 | =E24-AB24 | =SQRT(AM24*AM24+AN24*AN24) | =AM24/AO24 | =AN24/AO24 |
| 25 | =D25-AA25 | =E25-AB25 | =SQRT(AM25*AM25+AN25*AN25) | =AM25/AO25 | =AN25/AO25 |
| 26 | =D26-AA26 | =E26-AB26 | =SQRT(AM26*AM26+AN26*AN26) | =AM26/AO26 | =AN26/AO26 |
| 27 | =D27-AA27 | =E27-AB27 | =SQRT(AM27*AM27+AN27*AN27) | =AM27/AO27 | =AN27/AO27 |
| 28 | =D28-AA28 | =E28-AB28 | =SQRT(AM28*AM28+AN28*AN28) | =AM28/AO28 | =AN28/AO28 |
| 29 | =D29-AA29 | =E29-AB29 | =SQRT(AM29*AM29+AN29*AN29) | =AM29/AO29 | =AN29/AO29 |
| 30 | =D30-AA30 | =E30-AB30 | =SQRT(AM30*AM30+AN30*AN30) | =AM30/AO30 | =AN30/AO30 |
| 31 | =D31-AA31 | =E31-AB31 | =SQRT(AM31*AM31+AN31*AN31) | =AM31/AO31 | =AN31/AO31 |
| 32 | =D32-AA32 | =E32-AB32 | =SQRT(AM32*AM32+AN32*AN32) | =AM32/AO32 | =AN32/AO32 |
| 33 | =D33-AA33 | =E33-AB33 | =SQRT(AM33*AM33+AN33*AN33) | =AM33/AO33 | =AN33/AO33 |

|    | AR | AS |
|----|----|----|
| 1  |  |  |
| 2  |  |  |
| 3  | VERTEX a |  |
| 4  |  |  |
| 5  | Xarot | Yarot |
| 6  |  |  |
| 7  | =(AP6*AP7+AQ6*AQ7)*AO7 | =(AP6*AQ7-AQ6*AP7)*AO7 |
| 8  |  |  |
| 9  | =(AP8*AP9+AQ8*AQ9)*AO9 | =(AP8*AQ9-AQ8*AP9)*AO9 |
| 10 |  |  |
| 11 |  |  |
| 12 |  |  |
| 13 | Xarot | Yarot |
| 14 |  |  |
| 15 | =(AP14*AP15+AQ14*AQ15)*AO15 | =(AP14*AQ15-AQ14*AP15)*AO15 |
| 16 |  |  |
| 17 | =(AP16*AP17+AQ16*AQ17)*AO17 | =(AP16*AQ17-AQ16*AP17)*AO17 |
| 18 |  |  |
| 19 | =(AP18*AP19+AQ18*AQ19)*AO19 | =(AP18*AQ19-AQ18*AP19)*AO19 |
| 20 |  |  |
| 21 | =(AP20*AP21+AQ20*AQ21)*AO21 | =(AP20*AQ21-AQ20*AP21)*AO21 |
| 22 |  |  |
| 23 | =(AP22*AP23-AQ22*AQ23)*AO23 | =(AP22*AQ23-AQ22*AP23)*AO23 |
| 24 |  |  |
| 25 | =(AP24*AP25+AQ24*AQ25)*AO25 | =(AP24*AQ25-AQ24*AP25)*AO25 |
| 26 |  |  |
| 27 | =(AP26*AP27-AQ26*AQ27)*AO27 | =(AP26*AQ27-AQ26*AP27)*AO27 |
| 28 |  |  |
| 29 | =(AP28*AP29+AQ28*AQ29)*AO29 | =(AP28*AQ29-AQ28*AP29)*AO29 |
| 30 |  |  |
| 31 | =(AP30*AP31+AQ30*AQ31)*AO31 | =(AP30*AQ31-AQ30*AP31)*AO31 |
| 32 |  |  |
| 33 | =(AP32*AP33+AQ32*AQ33)*AO33 | =(AP32*AQ33-AQ32*AP33)*AO33 |

|    | AT | AU | AV | AW | AX |
|----|----|----|----|----|----|
| 1  |  |  |  |  |  |
| 2  |  |  |  |  |  |
| 3  | RELATIVE TO | VERTEX b |  |  |  |
| 4  | coordinates, | range | bearing and unit vectors | to vertex | b |
| 5  | Xbm | Ybm | Dbm | Xbmn | Ybmn |
| 6  | =F6-AA6 | =G6-AB6 | =SQRT(AT6*AT6+AU6*AU6) | =AT6/AV6 | =AU6/AV6 |
| 7  | =F7-AA7 | =G7-AB7 | =SQRT(AT7*AT7+AU7*AU7) | =AT7/AV7 | =AU7/AV7 |
| 8  | =F8-AA8 | =G8-AB8 | =SQRT(AT8*AT8+AU8*AU8) | =AT8/AV8 | =AU8/AV8 |
| 9  | =F9-AA9 | =G9-AB9 | =SQRT(AT9*AT9+AU9*AU9) | =AT9/AV9 | =AU9/AV9 |
| 10 |  |  |  |  |  |
| 11 |  |  |  |  |  |
| 12 | coordinates, | range | bearing and unit vectors | to vertex | b |
| 13 | Xbm | Ybm | Dbm | Xbmn | Ybmn |
| 14 | =F14-AA14 | =G14-AB14 | =SQRT(AT14*AT14+AU14*AU14) | =AT14/AV14 | =AU14/AV14 |
| 15 | =F15-AA15 | =G15-AB15 | =SQRT(AT15*AT15+AU15*AU15) | =AT15/AV15 | =AU15/AV15 |
| 16 | =F16-AA16 | =G16-AB16 | =SQRT(AT16*AT16+AU16*AU16) | =AT16/AV16 | =AU16/AV16 |
| 17 | =F17-AA17 | =G17-AB17 | =SQRT(AT17*AT17+AU17*AU17) | =AT17/AV17 | =AU17/AV17 |
| 18 | =F18-AA18 | =G18-AB18 | =SQRT(AT18*AT18+AU18*AU18) | =AT18/AV18 | =AU18/AV18 |
| 19 | =F19-AA19 | =G19-AB19 | =SQRT(AT19*AT19+AU19*AU19) | =AT19/AV19 | =AU19/AV19 |
| 20 | =F20-AA20 | =G20-AB20 | =SQRT(AT20*AT20+AU20*AU20) | =AT20/AV20 | =AU20/AV20 |
| 21 | =F21-AA21 | =G21-AB21 | =SQRT(AT21*AT21+AU21*AU21) | =AT21/AV21 | =AU21/AV21 |
| 22 | =F22-AA22 | =G22-AB22 | =SQRT(AT22*AT22+AU22*AU22) | =AT22/AV22 | =AU22/AV22 |
| 23 | =F23-AA23 | =G23-AB23 | =SQRT(AT23*AT23+AU23*AU23) | =AT23/AV23 | =AU23/AV23 |
| 24 | =F24-AA24 | =G24-AB24 | =SQRT(AT24*AT24+AU24*AU24) | =AT24/AV24 | =AU24/AV24 |
| 25 | =F25-AA25 | =G25-AB25 | =SQRT(AT25*AT25+AU25*AU25) | =AT25/AV25 | =AU25/AV25 |
| 26 | =F26-AA26 | =G26-AB26 | =SQRT(AT26*AT26+AU26*AU26) | =AT26/AV26 | =AU26/AV26 |
| 27 | =F27-AA27 | =G27-AB27 | =SQRT(AT27*AT27+AU27*AU27) | =AT27/AV27 | =AU27/AV27 |
| 28 | =F28-AA28 | =G28-AB28 | =SQRT(AT28*AT28+AU28*AU28) | =AT28/AV28 | =AU28/AV28 |
| 29 | =F29-AA29 | =G29-AB29 | =SQRT(AT29*AT29+AU29*AU29) | =AT29/AV29 | =AU29/AV29 |
| 30 | =F30-AA30 | =G30-AB30 | =SQRT(AT30*AT30+AU30*AU30) | =AT30/AV30 | =AU30/AV30 |
| 31 | =F31-AA31 | =G31-AB31 | =SQRT(AT31*AT31+AU31*AU31) | =AT31/AV31 | =AU31/AV31 |
| 32 | =F32-AA32 | =G32-AB32 | =SQRT(AT32*AT32+AU32*AU32) | =AT32/AV32 | =AU32/AV32 |
| 33 | =F33-AA33 | =G33-AB33 | =SQRT(AT33*AT33+AU33*AU33) | =AT33/AV33 | =AU33/AV33 |

|    | AY | AZ |
|----|----|----|
| 1  |    |    |
| 2  |    |    |
| 3  | VERTEX b |    |
| 4  |    |    |
| 5  | Xbrot | Ybrot |
| 6  |    |    |
| 7  | =(AW6*AW7+AX6*AX7)*AV7 | =(AW6*AX7-AX6*AW7)*AV7 |
| 8  |    |    |
| 9  | =(AW8*AW9+AX8*AX9)*AV9 | =(AW8*AX9-AX8*AW9)*AV9 |
| 10 |    |    |
| 11 |    |    |
| 12 |    |    |
| 13 | Xbrot | Ybrot |
| 14 |    |    |
| 15 | =(AW14*AW15+AX14*AX15)*AV15 | =(AW14*AX15-AX14*AW15)*AV15 |
| 16 |    |    |
| 17 | =(AW16*AW17+AX16*AX17)*AV17 | =(AW16*AX17-AX16*AW17)*AV17 |
| 18 |    |    |
| 19 | =(AW18*AW19+AX18*AX19)*AV19 | =(AW18*AX19-AX18*AW19)*AV19 |
| 20 |    |    |
| 21 | =(AW20*AW21-AX20*AX21)*AV21 | =(AW20*AX21-AX20*AW21)*AV21 |
| 22 |    |    |
| 23 | =(AW22*AW23+AX22*AX23)*AV23 | =(AW22*AX23-AX22*AW23)*AV23 |
| 24 |    |    |
| 25 | =(AW24*AW25+AX24*AX25)*AV25 | =(AW24*AX25-AX24*AW25)*AV25 |
| 26 |    |    |
| 27 | =(AW26*AW27+AX26*AX27)*AV27 | =(AW26*AX27-AX26*AW27)*AV27 |
| 28 |    |    |
| 29 | =(AW28*AW29+AX28*AX29)*AV29 | =(AW28*AX29-AX28*AW29)*AV29 |
| 30 |    |    |
| 31 | =(AW30*AW31+AX30*AX31)*AV31 | =(AW30*AX31-AX30*AW31)*AV31 |
| 32 |    |    |
| 33 | =(AW32*AW33+AX32*AX33)*AV33 | =(AW32*AX33-AX32*AW33)*AV33 |

|    | BA | BB | BC | BD | BE |
|----|----|----|----|----|----|
| 1  |    |    |    |    |    |
| 2  |    |    |    |    |    |
| 3  | RELATIVE TO | VERTEX c |    |    |    |
| 4  | coordinates, | range | bearing and unit vectors | to vertex | c |
| 5  | Xcm | Ycm | Dcm | Xcmn | Ycmn |
| 6  | =H6-AA6 | =I6-AB6 | =SQRT(BA6*BA6+BB6*BB6) | =BA6/BC6 | =BB6/BC6 |
| 7  | =H7-AA7 | =I7-AB7 | =SQRT(BA7*BA7+BB7*BB7) | =BA7/BC7 | =BB7/BC7 |
| 8  | =H8-AA8 | =I8-AB8 | =SQRT(BA8*BA8+BB8*BB8) | =BA8/BC8 | =BB8/BC8 |
| 9  | =H9-AA9 | =I9-AB9 | =SQRT(BA9*BA9+BB9*BB9) | =BA9/BC9 | =BB9/BC9 |
| 10 |    |    |    |    |    |
| 11 |    |    |    |    |    |
| 12 | coordinates, | range | bearing and unit vectors | to vertex | c |
| 13 | Xcm | Ycm | Dcm | Xcmn | Ycmn |
| 14 | =H14-AA14 | =I14-AB14 | =SQRT(BA14*BA14+BB14*BB14) | =BA14/BC14 | =BB14/BC14 |
| 15 | =H15-AA15 | =I15-AB15 | =SQRT(BA15*BA15+BB15*BB15) | =BA15/BC15 | =BB15/BC15 |
| 16 | =H16-AA16 | =I16-AB16 | =SQRT(BA16*BA16+BB16*BB16) | =BA16/BC16 | =BB16/BC16 |
| 17 | =H17-AA17 | =I17-AB17 | =SQRT(BA17*BA17+BB17*BB17) | =BA17/BC17 | =BB17/BC17 |
| 18 | =H18-AA18 | =I18-AB18 | =SQRT(BA18*BA18+BB18*BB18) | =BA18/BC18 | =BB18/BC18 |
| 19 | =H19-AA19 | =I19-AB19 | =SQRT(BA19*BA19+BB19*BB19) | =BA19/BC19 | =BB19/BC19 |
| 20 | =H20-AA20 | =I20-AB20 | =SQRT(BA20*BA20+BB20*BB20) | =BA20/BC20 | =BB20/BC20 |
| 21 | =H21-AA21 | =I21-AB21 | =SQRT(BA21*BA21+BB21*BB21) | =BA21/BC21 | =BB21/BC21 |
| 22 | =H22-AA22 | =I22-AB22 | =SQRT(BA22*BA22+BB22*BB22) | =BA22/BC22 | =BB22/BC22 |
| 23 | =H23-AA23 | =I23-AB23 | =SQRT(BA23*BA23+BB23*BB23) | =BA23/BC23 | =BB23/BC23 |
| 24 | =H24-AA24 | =I24-AB24 | =SQRT(BA24*BA24+BB24*BB24) | =BA24/BC24 | =BB24/BC24 |
| 25 | =H25-AA25 | =I25-AB25 | =SQRT(BA25*BA25+BB25*BB25) | =BA25/BC25 | =BB25/BC25 |
| 26 | =H26-AA26 | =I26-AB26 | =SQRT(BA26*BA26+BB26*BB26) | =BA26/BC26 | =BB26/BC26 |
| 27 | =H27-AA27 | =I27-AB27 | =SQRT(BA27*BA27+BB27*BB27) | =BA27/BC27 | =BB27/BC27 |
| 28 | =H28-AA28 | =I28-AB28 | =SQRT(BA28*BA28+BB28*BB28) | =BA28/BC28 | =BB28/BC28 |
| 29 | =H29-AA29 | =I29-AB29 | =SQRT(BA29*BA29+BB29*BB29) | =BA29/BC29 | =BB29/BC29 |
| 30 | =H30-AA30 | =I30-AB30 | =SQRT(BA30*BA30+BB30*BB30) | =BA30/BC30 | =BB30/BC30 |
| 31 | =H31-AA31 | =I31-AB31 | =SQRT(BA31*BA31+BB31*BB31) | =BA31/BC31 | =BB31/BC31 |
| 32 | =H32-AA32 | =I32-AB32 | =SQRT(BA32*BA32+BB32*BB32) | =BA32/BC32 | =BB32/BC32 |
| 33 | =H33-AA33 | =I33-AB33 | =SQRT(BA33*BA33+BB33*BB33) | =BA33/BC33 | =BB33/BC33 |

| | BF | BG |
|---|---|---|
| 1 | | |
| 2 | | . |
| 3 | VERTEX c | |
| 4 | | |
| 5 | Xcrot | Ycrot |
| 6 | | |
| 7 | =(BD6*BD7+BE6*BE7)*BC7 | =(BD6*BE7-BE6*BD7)*BC7 |
| 8 | | |
| 9 | =(BD8*BD9+BE8*BE9)*BC9 | =(BD8*BE9-BE8*BD9)*BC9 |
| 10 | | |
| 11 | | |
| 12 | | |
| 13 | Xcrot | Ycrot |
| 14 | | |
| 15 | =(BD14*BD15+BE14*BE15)*BC15 | =(BD14*BE15-BE14*BD15)*BC15 |
| 16 | | |
| 17 | =(BD16*BD17+BE16*BE17)*BC17 | =(BD16*BE17-BE16*BD17)*BC17 |
| 18 | | |
| 19 | =(BD18*BD19+BE18*BE19)*BC19 | =(BD18*BE19-BE18*BD19)*BC19 |
| 20 | | |
| 21 | =(BD20*BD21+BE20*BE21)*BC21 | =(BD20*BE21-BE20*BD21)*BC21 |
| 22 | | |
| 23 | =(BD22*BD23-BE22*BE23)*BC23 | =(BD22*BE23-BE22*BD23)*BC23 |
| 24 | | |
| 25 | =(BD24*BD25+BE24*BE25)*BC25 | =(BD24*BE25-BE24*BD25)*BC25 |
| 26 | | |
| 27 | =(BD26*BD27+BE26*BE27)*BC27 | =(BD26*BE27-BE26*BD27)*BC27 |
| 28 | | |
| 29 | =(BD28*BD29+BE28*BE29)*BC29 | =(BD28*BE29-BE28*BD29)*BC29 |
| 30 | | |
| 31 | =(BD30*BD31+BE30*BE31)*BC31 | =(BD30*BE31-BE30*BD31)*BC31 |
| 32 | | |
| 33 | =(BD32*BD33+BE32*BE33)*BC33 | =(BD32*BE33-BE32*BD33)*BC33 |

| | BH | BI | BJ | BK | BL |
|---|---|---|---|---|---|
| 1 | | | | | |
| 2 | | | | | . |
| 3 | RELATIVE TO | VERTEX d | | to vertex | d |
| 4 | coordinates, | range | bearing and unit vectors | | |
| 5 | Xdm | Ydm | Ddm | Xdmn | Ydmn |
| 6 | =J6-AA6 | =K6-AB6 | =SQRT(BH6*BH6+BI6*BI6) | =BH6/BJ6 | =BI6/BJ6 |
| 7 | =J7-AA7 | =K7-AB7 | =SQRT(BH7*BH7+BI7*BI7) | =BH7/BJ7 | =BI7/BJ7 |
| 8 | =J8-AA8 | =K8-AB8 | =SQRT(BH8*BH8+BI8*BI8) | =BH8/BJ8 | =BI8/BJ8 |
| 9 | =J9-AA9 | =K9-AB9 | =SQRT(BH9*BH9+BI9*BI9) | =BH9/BJ9 | =BI9/BJ9 |
| 10 | | | | | |
| 11 | | | | | |
| 12 | coordinates, | range | bearing and unit vectors | to vertex | d |
| 13 | Xdm | Ydm | Ddm | Ydmn | Ydmn |
| 14 | =J14-AA14 | =K14-AB14 | =SQRT(BH14*BH14+BI14*BI14) | =BH14/BJ14 | =BI14/BJ14 |
| 15 | =J15-AA15 | =K15-AB15 | =SQRT(BH15*BH15+BI15*BI15) | =BH15/BJ15 | =BI15/BJ15 |
| 16 | =J16-AA16 | =K16-AB16 | =SQRT(BH16*BH16+BI16*BI16) | =BH16/BJ16 | =BI16/BJ16 |
| 17 | =J17-AA17 | =K17-AB17 | =SQRT(BH17*BH17+BI17*BI17) | =BH17/BJ17 | =BI17/BJ17 |
| 18 | =J18-AA18 | =K18-AB18 | =SQRT(BH18*BH18+BI18*BI18) | =BH18/BJ18 | =BI18/BJ18 |
| 19 | =J19-AA19 | =K19-AB19 | =SQRT(BH19*BH19+BI19*BI19) | =BH19/BJ19 | =BI19/BJ19 |
| 20 | =J20-AA20 | =K20-AB20 | =SQRT(BH20*BH20+BI20*BI20) | =BH20/BJ20 | =BI20/BJ20 |
| 21 | =J21-AA21 | =K21-AB21 | =SQRT(BH21*BH21+BI21*BI21) | =BH21/BJ21 | =BI21/BJ21 |
| 22 | =J22-AA22 | =K22-AB22 | =SQRT(BH22*BH22+BI22*BI22) | =BH22/BJ22 | =BI22/BJ22 |
| 23 | =J23-AA23 | =K23-AB23 | =SQRT(BH23*BH23+BI23*BI23) | =BH23/BJ23 | =BI23/BJ23 |
| 24 | =J24-AA24 | =K24-AB24 | =SQRT(BH24*BH24+BI24*BI24) | =BH24/BJ24 | =BI24/BJ24 |
| 25 | =J25-AA25 | =K25-AB25 | =SQRT(BH25*BH25+BI25*BI25) | =BH25/BJ25 | =BI25/BJ25 |
| 26 | =J26-AA26 | =K26-AB26 | =SQRT(BH26*BH26+BI26*BI26) | =BH26/BJ26 | =BI26/BJ26 |
| 27 | =J27-AA27 | =K27-AB27 | =SQRT(BH27*BH27+BI27*BI27) | =BH27/BJ27 | =BI27/BJ27 |
| 28 | =J28-AA28 | =K28-AB28 | =SQRT(BH28*BH28+BI28*BI28) | =BH28/BJ28 | =BI28/BJ28 |
| 29 | =J29-AA29 | =K29-AB29 | =SQRT(BH29*BH29+BI29*BI29) | =BH29/BJ29 | =BI29/BJ29 |
| 30 | =J30-AA30 | =K30-AB30 | =SQRT(BH30*BH30+BI30*BI30) | =BH30/BJ30 | =BI30/BJ30 |
| 31 | =J31-AA31 | =K31-AB31 | =SQRT(BH31*BH31+BI31*BI31) | =BH31/BJ31 | =BI31/BJ31 |
| 32 | =J32-AA32 | =K32-AB32 | =SQRT(BH32*BH32+BI32*BI32) | =BH32/BJ32 | =BI32/BJ32 |
| 33 | =J33-AA33 | =K33-AB33 | =SQRT(BH33*BH33+BI33*BI33) | =BH33/BJ33 | =BI33/BJ33 |

| | BM | BN |
|---|---|---|
| 1 | | |
| 2 | | |
| 3 | VERTEX d | |
| 4 | | |
| 5 | Xdrot | Ydrot |
| 6 | | |
| 7 | =(BK6*BK7+BL6*BL7)*BJ7 | =(BK6*BL7-BL6*BK7)*BJ7 |
| 8 | | |
| 9 | =(BK8*BK9+BL8*BL9)*BJ9 | =(BK8*BL9-BL8*BK9)*BJ9 |
| 10 | | |
| 11 | | |
| 12 | | |
| 13 | Xdrot | Ydrot |
| 14 | | |
| 15 | =(BK14*BK15+BL14*BL15)*BJ15 | =(BK14*BL15-BL14*BK15)*BJ15 |
| 16 | | |
| 17 | =(BK16*BK17+BL16*BL17)*BJ17 | =(BK16*BL17-BL16*BK17)*BJ17 |
| 18 | | |
| 19 | =(BK18*BK19+BL18*BL19)*BJ19 | =(BK18*BL19-BL18*BK19)*BJ19 |
| 20 | | |
| 21 | =(BK20*BK21+BL20*BL21)*BJ21 | =(BK20*BL21-BL20*BK21)*BJ21 |
| 22 | | |
| 23 | =(BK22*BK23+BL22*BL23)*BJ23 | =(BK22*BL23-BL22*BK23)*BJ23 |
| 24 | | |
| 25 | =(BK24*BK25+BL24*BL25)*BJ25 | =(BK24*BL25-BL24*BK25)*BJ25 |
| 26 | | |
| 27 | =(BK26*BK27+BL26*BL27)*BJ27 | =(BK26*BL27-BL26*BK27)*BJ27 |
| 28 | | |
| 29 | =(BK28*BK29+BL28*BL29)*BJ29 | =(BK28*BL29-BL28*BK29)*BJ29 |
| 30 | | |
| 31 | =(BK30*BK31+BL30*BL31)*BJ31 | =(BK30*BL31-BL30*BK31)*BJ31 |
| 32 | | |
| 33 | =(BK32*BK33+BL32*BL33)*BJ33 | =(BK32*BL33-BL32*BK33)*BJ33 |

| | BO | BP | BQ |
|---|---|---|---|
| 1 | | | |
| 2 | | | |
| 3 | POLYGON | | |
| 4 | | | |
| 5 | mean rotation | cosine and sine | |
| 6 | | | |
| 7 | =BM7+BF7+AY7+AR7 | =BN7+BG7+AZ7+AS7 | =SQRT((BO7*BO7)+(BP7*BP7)) |
| 8 | | | |
| 9 | =BM9+BF9+AY9+AR9 | =BN9+BG9+AZ9+AS9 | =SQRT((BO9*BO9)+(BP9*BP9)) |
| 10 | | | |
| 11 | | | |
| 12 | | | |
| 13 | mean rotation | cosine and sine | |
| 14 | | | |
| 15 | =BM15+BF15+AY15+AR15 | =BN15+BG15+AZ15+AS15 | =SQRT((BO15*BO15)+(BP15*BP15)) |
| 16 | | | |
| 17 | =BM17+BF17+AY17+AR17 | =BN17+BG17+AZ17+AS17 | =SQRT((BO17*BO17)+(BP17*BP17)) |
| 18 | | | |
| 19 | =BM19+BF19+AY19+AR19 | =BN19+BG19+AZ19+AS19 | =SQRT((BO19*BO19)+(BP19*BP19)) |
| 20 | | | |
| 21 | =BM21+BF21+AY21+AR21 | =BN21+BG21+AZ21+AS21 | =SQRT((BO21*BO21)+(BP21*BP21)) |
| 22 | | | |
| 23 | =BM23+BF23+AY23+AR23 | =BN23+BG23+AZ23+AS23 | =SQRT((BO23*BO23)+(BP23*BP23)) |
| 24 | | | |
| 25 | =BM25+BF25+AY25+AR25 | =BN25+BG25+AZ25+AS25 | =SQRT((BO25*BO25)+(BP25*BP25)) |
| 26 | | | |
| 27 | =BM27+BF27+AY27+AR27 | =BN27+BG27+AZ27+AS27 | =SQRT((BO27*BO27)+(BP27*BP27)) |
| 28 | | | |
| 29 | =BM29+BF29+AY29+AR29 | =BN29+BG29+AZ29+AS29 | =SQRT((BO29*BO29)+(BP29*BP29)) |
| 30 | | | |
| 31 | =BM31+BF31+AY31+AR31 | =BN31+BG31+AZ31+AS31 | =SQRT((BO31*BO31)+(BP31*BP31)) |
| 32 | | | |
| 33 | =BM33+BF33+AY33+AR33 | =BN33+BG33+AZ33+AS33 | =SQRT((BO33*BO33)+(BP33*BP33)) |

|    | BR | BS | BT |
|----|----|----|----|
| 1  |    |    |    |
| 2  |    |    |    |
| 3  | POLYGON |    |    |
| 4  |    |    |    |
| 5  | cosine | sine | ø |
| 6  |    |    |    |
| 7  | =BO7/BQ7 | =BP7/BQ7 | =ATAN2(BR7,BS7) |
| 8  |    |    |    |
| 9  | =BO9/BQ9 | =BP9/BQ9 | =ATAN2(BR9,BS9) |
| 10 |    |    |    |
| 11 |    |    |    |
| 12 |    |    |    |
| 13 | cosine | sine | ø |
| 14 |    |    |    |
| 15 | =BO15/BQ15 | =BP15/BQ15 | =ATAN2(BR15,BS15) |
| 16 |    |    |    |
| 17 | =BO17/BQ17 | =BP17/BQ17 | =ATAN2(BR17,BS17) |
| 18 |    |    |    |
| 19 | =BO19/BQ19 | =BP19/BQ19 | =ATAN2(BR19,BS19) |
| 20 |    |    |    |
| 21 | =BO21/BQ21 | =BP21/BQ21 | =ATAN2(BR21,BS21) |
| 22 |    |    |    |
| 23 | =BO23/BQ23 | =BP23/BQ23 | =ATAN2(BR23,BS23) |
| 24 |    |    |    |
| 25 | =BO25/BQ25 | =BP25/BQ25 | =ATAN2(BR25,BS25) |
| 26 |    |    |    |
| 27 | =BO27/BQ27 | =BP27/BQ27 | =ATAN2(BR27,BS27) |
| 28 |    |    |    |
| 29 | =BO29/BQ29 | =BP29/BQ29 | =ATAN2(BR29,BS29) |
| 30 |    |    |    |
| 31 | =BO31/BQ31 | =BP31/BQ31 | =ATAN2(BR31,BS31) |
| 32 |    |    |    |
| 33 | =BO33/BQ33 | =BP33/BQ33 | =ATAN2(BR33,BS33) |

I claim:

1. A pattern recognition system comprising:

means for periodically generating a scene comprising a plurality of data points, each said data point comprising the position of and a unique identifier assigned to a point in space;

means for prestoring a map comprising a plurality of said data points representing reference points;

means for determining a coordinate transformation matrix between said scene and said map, said determining means including:

means for recognizing a geometrical figure in said scene that is exclusively congruent with another geometrical figure in said map, said recognizing means including:

means for generating a list of matched lines, including:

means for calculating the length of the straight line between any two said data points;

means for determining if a said straight line in said scene matches another said straight line in said map in length within the limits of accuracy of said generating means;

means for systematically searching for said matched lines; and means for storing said matched lines according to said identifiers of their terminations; and means for searching said list of matched lines for a geometrical figure in said scene that is exclusively congruent with a geometrical figure in said map; and means for computing said coordinate transformation matrix from the relative displacements in position and orientation between said congruent geometrical figures.

2. A navigational system comprising:

means for periodically generating a scene comprising a plurality of data points, each said data point possibly representing a feature in the environment, said generating means including:

sensing means for periodically sensing the presence and position of said features;

means for consolidating groups of said sensed features that are too closely clustered to be reliably resolved by said sensing means including:

means for identifying clusters of two or more sensed features that occupy a spaced too small to be reliably resolved by said sensing means; and means for replacing each said cluster by a single sensed feature located at the center of said cluster; and means for storing a data point to represent each said sensed feature, said data point comprising its position and a unique identifier;

means for prestoring a map comprising a plurality of data points representing reference features;

means for determining a coordinate transformation matrix between said scene and said map, said determining means including:

means for recognizing a geometrical figure in said scene that is exclusively congruent with another geometrical figure in said map, said recognizing means including:

means for generating a list of matched lines, including:

means for calculating the length of the straight line between any two said data points;

means for determining if a said straight line in said scene matches another said straight line in said map in length within the limits of accuracy of said sensing means;

means for systematically searching for said matched lines; and means for storing said matched lines according to said identifiers of their terminations;

means for reducing said list of matched lines, said reducing means including:

means for accumulating a tally of the number of said pairs of matched lines that a said data point in said scene shares with a said data point in said map, for all combinations thereof;

means for generating a list of likely matched points, including means for pairing each said data point in said scene with the data point in said map with which it shares the largest said tally; means for pairing each said data point in said map with the data point in said scene with which it shares the largest said tally; and means for storing said point pairs in said list of likely matched points in a systematic manner according to their said identifiers; and means for eliminating from said list of matched lines those matched lines that do not connect any two pairs of said likely matched points; and means for searching said list of matched lines for a geometrical figure in said scene that is exclusively congruent with a geometrical figure in said map; and means for computing said coordinate transformation matrix from the relative displacements in position and orientation between said congruent geometrical figures; and means for updating the position and heading of said navigational system from said coordinate transformation matrix.

3. A navigational system of claim 2 wherein said sensing means comprises a sonar set.

4. A navigational system of claim 2 wherein said scene and map are digitally stored.

5. A navigational system of claim 2 including a map updating means comprising:

means to detect new data points that, through said coordinate transformation matrices, consistently map into coincident locations in said map and to add said new data points to said map; and means to detect the consistent absence in said scenes of data points in said map and to remove said data points from said map.

* * * * *